(12) United States Patent
Lo et al.

(10) Patent No.: US 11,310,540 B2
(45) Date of Patent: Apr. 19, 2022

(54) INTERFACES BETWEEN DASH AWARE APPLICATION AND DASH CLIENT FOR SERVICE INTERACTIVITY SUPPORT

(71) Applicant: QUALCOMM Incorporated, San Diego, CA (US)

(72) Inventors: Charles Nung Lo, San Diego, CA (US); Thomas Stockhammer, Bergen (DE); Giridhar Dhati Mandyam, San Diego, CA (US); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/184,683

(22) Filed: Nov. 8, 2018

(65) Prior Publication Data
US 2019/0149857 A1 May 16, 2019

Related U.S. Application Data

(60) Provisional application No. 62/584,494, filed on Nov. 10, 2017, provisional application No. 62/584,344, filed on Nov. 10, 2017.

(51) Int. Cl.
*H04N 21/234* (2011.01)
*H04N 21/43* (2011.01)
(Continued)

(52) U.S. Cl.
CPC ... *H04N 21/23424* (2013.01); *H04L 65/4084* (2013.01); *H04L 65/80* (2013.01);
(Continued)

(58) Field of Classification Search
CPC ........ H04N 21/23424; H04N 21/26258; H04L 65/4084; H04L 65/80; H04L 67/02; H04W 4/06
See application file for complete search history.

(56) References Cited

U.S. PATENT DOCUMENTS 8,836,716 B1 * 9/2014 Gaddy ............ H04N 9/67
345/591
8,837,826 B1 * 9/2014 Gaddy ............ H04N 19/132
382/166
(Continued)

FOREIGN PATENT DOCUMENTS

CN 107018446 A 8/2017
WO 2011088264 A1 7/2011
(Continued)

OTHER PUBLICATIONS

"3GPP TS 26.247, V14.3.0, 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 14)", Sep. 2017, 106 pages.
(Continued)

*Primary Examiner* — William G Trost, IV
*Assistant Examiner* — Monishwar Mohan
(74) *Attorney, Agent, or Firm* — Campbell C. Chiang; Shumaker & Sieffert, P.A.

(57) ABSTRACT

In one example, a device includes one or more processors implemented in circuitry and configured to execute a Dynamic Adaptive Streaming over HTTP (DASH) aware application (DAA) and a DASH client, and one or more user interfaces. The DAA subscribes to DASH events of a DASH event stream via a first application programming interface (API) between the DAA and a DASH client executed by the one or more processors. The DAA then receives data for one or more DASH events of the DASH event stream from the DASH client via a second API between the DAA and the DASH client, the data for the one or more DASH events specifying interactivity-related content. The DAA then presents the interactivity-related content via the one or more user interfaces. The DAA may further send usage measurements
(Continued)

on usage of the interactivity-related content to the DASH client, for reporting to a report server device.

27 Claims, 10 Drawing Sheets

(51) Int. Cl.
| | |
|---|---|
| *H04N 21/475* | (2011.01) |
| *H04N 21/262* | (2011.01) |
| *H04N 21/442* | (2011.01) |
| *H04N 21/443* | (2011.01) |
| *H04N 21/431* | (2011.01) |
| *H04N 21/658* | (2011.01) |
| *H04N 21/654* | (2011.01) |
| *H04W 4/06* | (2009.01) |
| *H04L 29/06* | (2006.01) |
| *H04N 21/478* | (2011.01) |
| *H04N 21/845* | (2011.01) |
| *H04N 21/8545* | (2011.01) |
| *H04L 29/08* | (2006.01) |
| *H04N 21/81* | (2011.01) |
| *H04L 65/612* | (2022.01) |
| *H04L 65/80* | (2022.01) |
| *H04L 67/02* | (2022.01) |

(52) U.S. Cl.
CPC ....... *H04L 67/02* (2013.01); *H04N 21/26258* (2013.01); *H04N 21/4307* (2013.01); *H04N 21/4312* (2013.01); *H04N 21/4431* (2013.01); *H04N 21/44204* (2013.01); *H04N 21/478* (2013.01); *H04N 21/4756* (2013.01); *H04N 21/4758* (2013.01); *H04N 21/654* (2013.01); *H04N 21/6582* (2013.01); *H04N 21/812* (2013.01); *H04N 21/8456* (2013.01); *H04N 21/8545* (2013.01); *H04W 4/06* (2013.01)

(56) References Cited

U.S. PATENT DOCUMENTS

| | | | |
|---|---|---|---|
| 9,136,958 B2 | 9/2015 | Walker et al. | |
| 2013/0268761 A1* | 10/2013 | Giladi | H04N 21/8456 713/170 |
| 2014/0173660 A1* | 6/2014 | Correa | H04L 65/602 725/42 |
| 2015/0269629 A1* | 9/2015 | Lo | H04N 21/85406 705/14.66 |
| 2015/0270979 A1* | 9/2015 | Andrada | H04L 51/38 370/390 |
| 2015/0381756 A1* | 12/2015 | Lotfallah | H04L 67/18 709/213 |
| 2016/0034306 A1* | 2/2016 | Galdy | G06F 9/5066 718/104 |
| 2016/0036693 A1* | 2/2016 | Galdy | H04L 69/164 709/219 |
| 2016/0036886 A1* | 2/2016 | Ito | H04L 65/80 709/219 |
| 2016/0182923 A1* | 6/2016 | Higgs | H04N 21/23424 725/34 |
| 2016/0182973 A1* | 6/2016 | Winograd | H04N 21/4722 725/25 |
| 2016/0292398 A1* | 10/2016 | Makam | G06F 21/105 |
| 2017/0063960 A1* | 3/2017 | Stockhammer | H04N 21/44209 |
| 2017/0223432 A1* | 8/2017 | Lee | H04N 7/08 |
| 2018/0026733 A1* | 1/2018 | Yang | H04N 21/4882 725/33 |
| 2018/0035153 A1* | 2/2018 | Yang | H04N 21/4104 |
| 2018/0077210 A1* | 3/2018 | Hannuksela | H04N 21/47217 |
| 2018/0139507 A1* | 5/2018 | Toksoz | A63F 13/355 |
| 2018/0190327 A1* | 7/2018 | Coward | H04L 65/4084 |
| 2019/0026444 A1* | 1/2019 | Yamagishi | G06F 21/16 |
| 2019/0079787 A1* | 3/2019 | Toksoz | G06F 9/485 |

FOREIGN PATENT DOCUMENTS

| | | | |
|---|---|---|---|
| WO | WO-2011088264 A1 * | 7/2011 | ............ H04N 21/47 |
| WO | 2013192137 A1 | 12/2013 | |
| WO | 2016140479 A1 | 9/2016 | |

OTHER PUBLICATIONS

"3GPP TS 26.346, V14.7.0, 3rd Generation Partnership Project; Technical Specification Group Services and System Aspects; Multimedia Broadcast/Multicast Service (MBMS); Protocols and Codecs (Release 14)", Sep. 2018, 277 pages.
"3GPP TS 26.347, V14.2.0, 3rd Generation Partnership Project; Technical Specification Group Services and System Aspects; Multimedia Broadcast/Multicast Service (MBMS); Application Programming Interface and URL, (Release 14)", Sep. 2017, 124 pages.
ATSC Candidate Standard: Application Signaling (A/337), Doc. S33-337r1, Oct. 31, 2017, 35 pages.
Fielding R., et al., "Hypertext Transfer Protocol—HTTP/1.1", Network Working Group, Request for Comments, RFC 2616, Jun. 1999, 114 Pages.
International Search Report and Written Opinion—PCT/US2018/060072—ISA/EPO—dated Feb. 4, 2019.
International Standard., "Information Technology—Dynamic Adaptive Streaming over HTTP (DASH)—Part 1 Media Presentation Description and Segment Formats", MPEG Meeting;Oct. 19, 2015-Oct. 23, 2015; Geneva; (Motion Picture Expert Group or ISO/IEC JTC1/SC29/WG11), No. N15686, ISO/IEC 23009-1, Third Edition, XP030022374, Dec. 8, 2015, pp. 1-191.
International Standard ISO/IEC 14496-12, Information Technology—Coding of audio-visual objects—Part 12: ISO base media file format, Third Edition, Oct. 15, 2008, 120 pp.
ISO/IEC 23008-1:2017: Information technology—High efficiency coding and media delivery in heterogeneous environments—Part 1: MPEG media transport (MMT), Aug. 2017, 156 pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, "Series H: Audiovisual and Multimedia Systems, Infrastructure of audiovisual services—Coding of moving video, High efficiency video coding," The International Telecommunication Union. Dec. 2016, 664 pp.
Paila T., et al., "FLUTE—File Delivery over Unidirectional Transport," Network Working Group, RFC 6726, Nov. 2012, 46 Pages, Retrieved from the Internet http://tools.ietf.org/html/rfc6726.

* cited by examiner

INTERFACES BETWEEN DASH AWARE APPLICATION AND DASH CLIENT FOR SERVICE INTERACTIVITY SUPPORT

This application claims the benefit of U.S. Provisional Application No. 62/584,344, filed Nov. 10, 2017, and U.S. Provisional Application No. 62/584,494, filed Nov. 10, 2017, the entire content of each of which is hereby incorporated by reference.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. In addition, server devices (such as network servers, devices of content delivery networks (CDNs), and the like) may transmit media data to client devices (such as personal computers, set top boxes, mobile devices such as laptops, cellular telephones, and the like), e.g., via streaming or on-demand network protocols. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also known as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

Data, such as media data including video, audio, and timed text data, may be delivered in a variety of transport methods. One such method is multimedia broadcast/multicast services (MBMS) in Third Generation Partnership Project (3GPP) networks. MBMS, for example, allows the delivery of services of interest to large numbers of subscribers using a single delivery pipe.

SUMMARY

In general, this application describes techniques by which a Dynamic Adaptive Streaming over HTTP (DASH) aware application (DAA) can subscribe to various types of DASH-related information, such as DASH events and/or timed web asset track data. In particular, application programming interfaces (APIs) may be defined between the DAA and a DASH client executed by one or more processors of a client device to allow for subscription and subscription to, and delivery of, data of DASH events and/or timed web asset tracks. In addition, the DAA may maintain data representing a time during which a user interacts with interactivity-related content of the DASH events, and send the data to the DASH client via a corresponding API.

In one example, a method of receiving media data includes subscribing, by a Dynamic Adaptive Streaming over HTTP (DASH) aware application executed by one or more processors comprising circuitry of a client device, to DASH events of a DASH event stream via a first application programming interface (API) between the DASH aware application and a DASH client executed by the one or more processors; receiving, by the DASH aware application, data for one or more DASH events of the DASH event stream from the DASH client via a second API between the DASH aware application and the DASH client, the data for the one or more DASH events specifying interactivity-related content; and presenting, by the DASH aware application, the interactivity-related content via one or more user interfaces of the client device.

In another example, a device for receiving media data includes one or more user interfaces for presenting media data; and one or more processors implemented in circuitry and configured to execute a Dynamic Adaptive Streaming over HTTP (DASH) aware application and a DASH client. The DASH aware application is configured to subscribe to DASH events of a DASH event stream via a first application programming interface (API) between the DASH aware application and the DASH client; receive data for one or more DASH events of the DASH event stream from the DASH client via a second API between the DASH aware application and the DASH client, the data for the one or more DASH events specifying interactivity-related content; and present the interactivity-related content via the one or more user interfaces of the client device.

In another example, a device for receiving media data includes means for executing a Dynamic Adaptive Streaming over HTTP (DASH) aware application to subscribe to DASH events of a DASH event stream via a first application programming interface (API) between the DASH aware application and a DASH client; means for executing the DASH aware application to receive data for one or more DASH events of the DASH event stream from the DASH client via a second API between the DASH aware application and the DASH client, the data for the one or more DASH events specifying interactivity-related content; and means for presenting the interactivity-related content.

In another example, a computer-readable storage medium has stored thereon instructions that, when executed, cause one or more processors that execute a Dynamic Adaptive Streaming over HTTP (DASH) aware application and a DASH client to: subscribe, by the DASH aware application, to DASH events of a DASH event stream via a first application programming interface (API) between the DASH aware application and the DASH client; receive, by the DASH aware application, data for one or more DASH events of the DASH event stream from the DASH client via a second API between the DASH aware application and the DASH client, the data for the one or more DASH events specifying interactivity-related content; and present, by the DASH aware application, the interactivity-related content via one or more user interfaces of the client device.

The details of one or more examples are set forth in the accompanying drawings and the description below. Other features, objects, and advantages will be apparent from the description and drawings, and from the claims.

DETAILED DESCRIPTION

Figure 1:
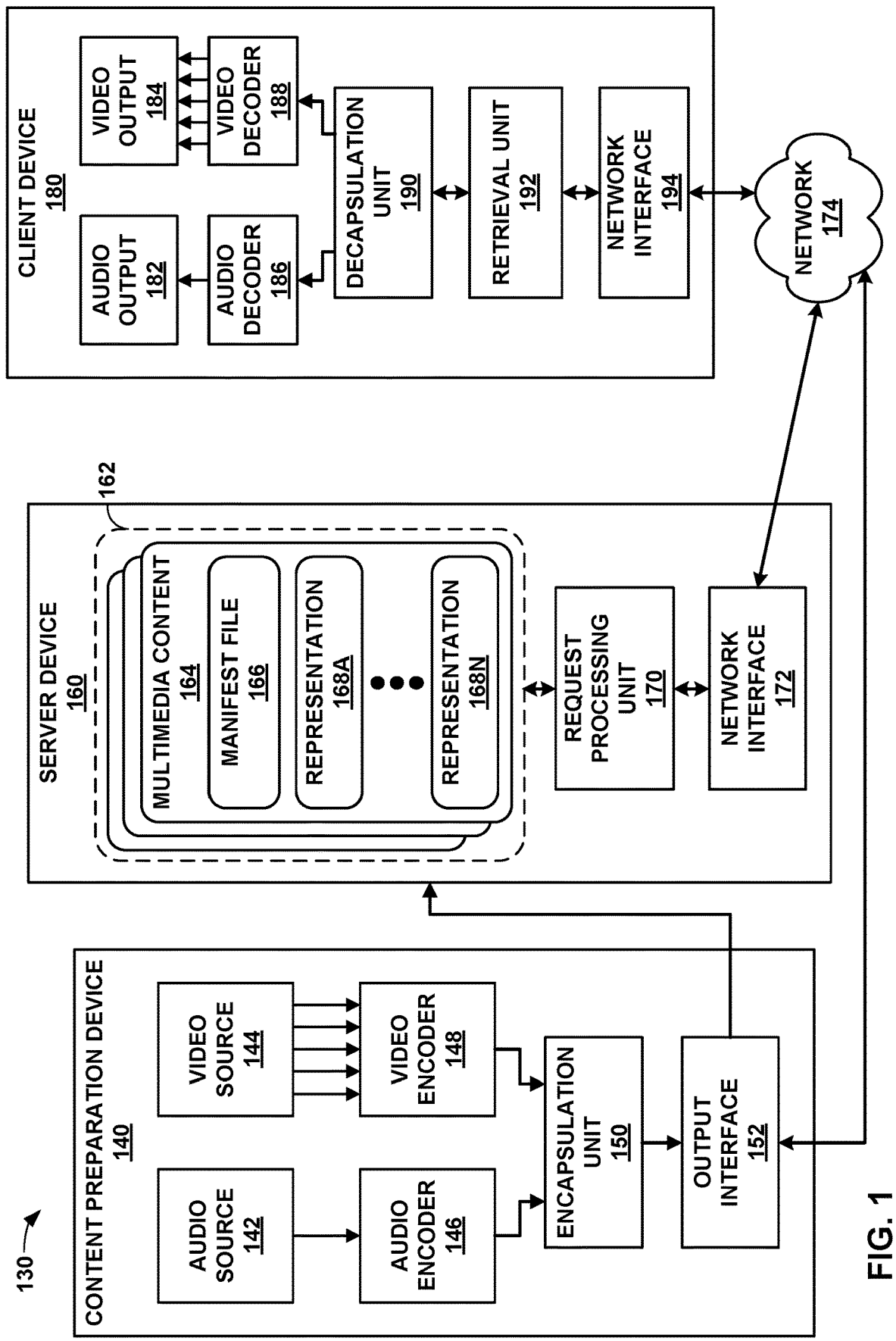
FIG. 1 is a block diagram illustrating an example system that implements techniques for streaming media data over a network according to the techniques of this disclosure.

Service interactivity, i.e., the ability for the end-user to dynamically and actively engage with the delivered service/content, for example, a broadcast audio/visual service or program, is an important feature whose support is being specified in the relevant standards organizations such as Advanced Television Systems Committee (ATSC), Digital Video Broadcast (DVB) and $3^{rd}$ Generation Partnership Project (3GPP). Especially, engagement with real-time services is an attractive concept. Especially, engagement with real-time services is an attractive and potentially monetizable concept, for example, for enabling advertising. Service interactivity may comprise functionality such as user engagement with the rendered programs such as voting, rating, purchasing, online chats, and reception of targeted advertisements or other content, often through typing or clicking of user interface (UI) features such as, for example, hyperlinks, radio buttons, or displayed forms. This is a widely understood and appreciated concept and already widely employed in peer-to-peer services. Service and content providers which provide service interactivity features would furthermore desire that personalized interactivity experiences can be provided to the user, for example, via knowledge of the user employing criteria such as preference/profile information, user location, or time of day. Such functionalities are well-known from Internet streaming services, especially when consumed in apps or browsers. In conjunction there is typically far more sophisticated methods involving data analytics on the device and or network side to enable personalized interactivity.

Personalized and interactive service capabilities, for example associated with 3GPP streaming and download services, via unicast and/or broadcast delivery, can drive higher end-user satisfaction and loyalty to the service operator, i.e., create greater "stickiness" of the operator's service offerings such as linear TV programs, live sports events and downloadable multimedia content. It would also provide a means for the operator to further monetize streaming services, for example, when distributed over Multimedia Broadcast/Multicast Service (MBMS), by, for example, increasing the subscriber base through premium contextual service offerings, for example, a click-through paid by the user or by the $3^{rd}$ party provider; supporting on-demand information or targeted advertising via simple user interaction such as click-to-call, click-to-SMS (Short Message Service), or click-to-Web access, or other well-known and exclusively unicast-based business methods; and/or driving greater cellular airtime or data volume usage associated with end-user initiated traffic pertaining to interactivity, the fees for which may be borne by a 3rd-party entity such as an advertiser or content provider, as opposed to the subscriber.

Continuous media content delivery, such as video streaming services using Adaptive Bit-Rate (ABR) technology such as MPEG-DASH (Dynamic Adaptive Streaming over HTTP)(ISO/IEC 23009-1 "Information Technology—Dynamic Adaptive Streaming over HTTP (DASH)—Part 1: Media Presentation Description and Segment Formats, Jan. 9, 2017), is popularly used in both the OTT world as well as managed operator services such as 3GPP eMBMS (ETSI TS 26.247, 26.346, 26.347), ATSC 3.0 (A/337, A/344), and hybrid broadcast/broadband services delivery in DVB-T systems. For service interactivity support in the delivery of DASH-formatted services, a mechanism being adopted in standards is the use of DASH Event streams, as specified in MPEG-DASH (ISO/IEC 23009-1) for signaling of any of a variety of types of application-specific event, such as the dynamic occurrence and carriage of interactivity-related content or metadata. This is done in the ATSC 3.0 specifications A/337 and A/344, and profiled in the DASH Interoperability Point for ATSC 3.0 specification from the DASH Industry Forum (DASH-IF).

In ATSC 3.0 A/344, a specific mechanism is defined whereby the interactivity-capable application, called the "Broadcaster Application" (BA) running in the ATSC 3.0 TV receiver device can subscribe to callback-based delivery of DASH Event messages which provide service interactivity related information for the BA, and are carried as either MPD (Media Presentation Description) Events or inband Event streams (i.e., as 'emsg' boxes) from a Receiver-based Web Server, via JSON-RPC based WebSocket APIs (Application Program Interface). The former type (MPD Events) are most suitable for "static" service interactivity events, i.e., when the occurrence time of the interactivity functionality is known a-priori. The latter type (inband Event stream messages carried inside 'emsg' boxes) are well-suited for "dynamic" interactivity events—i.e., ones for which the timing only becomes known at the last minute (such as service interactivity incidence requiring some action by the application, triggered by an unpredictable and dynamic occurrence such as when a team scores in a live sports program).

ISO/IEC 23009-1 states, "Events may be provided in the MPD or within a Representation in order to signal aperiodic information to the DASH client or to an application. Events are timed, i.e. each event starts at a specific media presentation time and typically has a duration. Events include DASH specific signaling or application-specific events. In the latter case, a proper scheme identifier identifies the application such that the DASH client can forward the event to the proper application. Events of the same type are clustered in Event Streams. This enables a DASH client to subscribe to an Event Stream of interest and ignore Event Streams that are of no relevance or interest."

Various techniques to achieve better results to address identified limiting factors are described below. These example techniques address interactivity event subscription and notification, and interactivity usage reporting.

One example technique includes interactivity event subscription and notification. Given the intended use, such as in ATSC 3.0, of DASH Events as the mechanism for triggering and describing intended service interactivity incidents, which can occur in either static or dynamic fashion within a main program, it is desirable to define a standard solution that would enable such signaling and metadata acquisition by interactivity-capable DASH Aware service Applications running in user terminals such as UEs or other portable devices such as tablets and laptops PCs, as well as fixed devices such as set-top boxes and TVs. The logical source of DASH Event messages, regardless of whether they are sent in the MPD, or delivered inband to the media streams of the main program, is the DASH client, which receives the Events from the MPD or in the DASH media stream.

This disclosure recognizes that it is desirable for APIs to be defined between the DASH-Aware Application, or "DAA" and the DASH client to expose relevant functionalities, such as to enable the application to register and subscribe to the DASH client for the acquisition of DASH Events messages, and for the DASH client to in turn deliver those Events to the application via notifications. However, this disclosure notes that such DAA-to-DASH client APIs are not currently defined by any standards organization or industry forum. The closest functional equivalent, as previously mentioned about the A/344 specification in ATSC 3.0, are the Web Socket APIs between the Receiver Web Server and the Broadcaster Application—namely, the "Event Stream Subscribe" API, "Event Stream Unsubscribe" API, and the "Event Stream Event" API.

The names of these first two example APIs are self-descriptive—to enable the Broadcaster Application to subscribe (or un-subscribe) to the forwarding of DASH Event stream messages, with the indicated "schemeUdUri" and "value" attributes, from the Receiver Web Server. The Event Stream Event API is a notification API invoked by the Receiver to transfer to the application those DASH Event stream messages with the matching "schemeUdUri" and "value" attributes. In the ATSC case, the peer entity to the DAA of these APIs is not the DASH client, but is the receiver middleware, the latter of which can be considered as a purpose-built as opposed to generic endpoint from the API perspective. Therefore, this disclosure notes that Event Stream subscription and un-subscription, and notification APIs should ideally be defined between the DAA and DASH client.

Another method for carriage of web data related data inside ISO BMFF (ISO base media file format) is being defined in MPEG (in SC29/WG11), for example as defined in w17242. It pertains to the delivery of a timed track structure auxiliary and synchronized to the audio or video tracks in the same ISO BMFF file. Such timed track, could be defined to store Web resources as well as how references from these Web resources to the file that carry them are handled. Specifically, the storage enables the delivery of synchronized media and Web resources supportable by ISO/IEC 14496-12 including file download, progressive file download, streaming, broadcast, etc. Although it is assumed in this MPEG work that the ISO BMFF file contains the "Web resources" track, sufficient information such that the file can be played out by a regular browser, it may also be desirable for the timed metadata in this track to be exposed to the DASH Aware Application to process if the track data is not meant to be handled directly by a regular web runtime engine. For example, the DAA belongs to an interactivity-capable "Native" application as opposed to being a (browser-based) Web application. For this purpose, this disclosure notes that the "Timed Metadata Track" subscription and notification API between the DAA and DASH client should, ideally, be defined. The type of the metadata may be web resources or it may be other types of metadata.

Another example technique includes interactivity usage reporting. For broadcast media services associated interactivity functionality, the provider of the program service or the associated interactivity media content, in most cases is interested in the quantitative measurement of user consumption of or engagement with the interactivity-related features or content (e.g., number of instances and/or time durations in the viewing of interactivity-related media content, number of click-throughs associated with pop-up interactivity links, text entry in displayed forms, interactivity-related product purchases, etc.). The carriage of the Event data can also be tracked by the DAA (e.g. if the Event data was in-band, track based, etc.). Moreover, if the Event data contains identifiers that can be interpreted by the service provider, the DAA could use this information to provide finer grained interactivity usage logging. That information is valuable to the service/content provider, or possibly 3rd party entities such as advertisers, in obtaining better understanding of end-user behavior or interests for use in targeted delivery of additional content, ads, promotions, etc.

In operator-provided services such as DASH-based 3GPP MBMS or Packet Switch Streaming (PSS), the associated service layer functionality includes rich capabilities in the reporting of reception statistics and QoE (quality of experience) metrics, including features such as controlling the percentage of total devices that perform reporting, and the specification of back-off timers in device initiation of reporting, or the identification alternative reporting server URLs (Uniform Resource Locators) represent the means to avoid potential unicast network congestion due to reporting traffic, or enabling more even distribution of reporting traffic load across multiple servers. Already in the 3GPP SA4 Release 15 Service Interactivity ('SerInter') Work Item, stated objectives include the ability to reuse existing MBMS service layer functionality for the announcement of parameters and criteria regarding interactivity, control of device population to perform such reporting, and existing reporting protocols regarding service reception or consumption.

This disclosure recognizes that it would be logical to consider the offloading by the interactivity-capable DAA to other device-based application software or middleware, such as the DASH client, which already performs service layer based QoE reporting functionality, to handle the interactivity usage reporting function on behalf of the application. In turn, the DASH client could request the MBMS client to handle the interactivity usage reporting on its behalf, and such functionality is already defined in TS 26.346 with respect to MBMS reception reporting of DASH QoE metrics. Reuse of existing reporting functionality should be especially attractive to a service provider acting also as the network operator of MBMS or PSS services, since it already controls the network equipment and device entities which handle the overall reporting functionality.

With regards to APIs between the DAA and the DASH client, this disclosure notes that it is desirable that in addition, the "Interactivity Usage Log Forwarding" API be defined to enable the application to rely on the DASH client and the subtending device or network functionality associated with service consumption, reception statistics, and QoE metrics reporting to perform subsequent reporting of interactivity-related usage information logged and forwarded by the DAA. As indicated in the previous section, this disclosure notes that no APIs have been defined to-date between the DASH client and the device application it serves.

This disclosure proposes a set of APIs (Application Program Interfaces) between a DASH-Aware Application (DAA) and a DASH client, both entities operating inside a user device (UE, portable device such as a tablet or laptop PC), fixed terminal (e.g. set-top box or large screen TV), in support of service interactivity features. The interactivity features are associated with dynamic and unpredictable, or static and pre-defined events which occur during the play-out of a main service or program. The service may be delivered OTT (Over-the-top), or be a managed service such as eMBMS (Evolved Multimedia Broadcast Multicast Services), terrestrial broadcast TV (ATSC 3.0, DVB-T, etc.) or IPTV (Internet Protocol television) based. This disclosure proposes the following APIs (referred hereon as "DASH-APIs") defined between the DAA and the DASH client:

API 1—registerInteracApp( )
API 2—registerInteracResponse( )
API 3—eventSubscribe( )
API 4—eventResponse( )
API 5—inbandEventSubscribe( )
API 6—inbandEventSubscribeResponse( )
API 7—mpdEventSubscribe( )
API 8—mpdEventSubscribeResponse( )
API 9—eventNotif( )
API 10—eventNotifResponse( )
API 11—inbandEventNotif( )
API 12—inbandEventNotifResponse( )
API 13—mpdEventNotif( )
API 14—mpdEventNotifResponse( )
API 15—eventUnsubscribe( )
API 16—eventUnsubscribeResponse( )
API 17—inbandEventUnsubscribe( )
API 18—inbandEventUnsubscribeResponse( )
API 19—mpdEventUnsubscribe( )
API 20—mpdEventUnsubscribeResponse( )
API 21—timedMetadataTrackSubscribe( )
API 22—timedMetadataTrackResponse( )
API 23—timedMetadataTrackNotif( )
API 24—timedMetadataTrackNotifResponse( )
API 25—timedWebAssetTrackUnsubscribe( )
API 26—timedWebAssetTrackUnsubscribeResponse( )
API 27—interacUsageMeasurementNotify( )
API 28—interacUsageMeasurementResponse( )
API 29—interacUsageLogForward( )
API 30—interacUsageLogForwardResponse( )
API 31—deregisterInteracApp( )
API 32—deregisterInteracResponse( )

APIs 1 and 2 pertain to the basic requirement that the DAA must be registered with the DASH client to be eligible to perform subsequent API calls, such as subscribing to interactivity-specific DASH Event notifications when those are available to the DASH client.

API 3 (and associated response from the DASH client via API 4) enable the DAA to subscribe for the notification-based delivery of any type of Event Streams which pertain to the signaling and metadata carriage of service interactivity events, i.e., 'emsg' boxes inband to media delivery, or MPD Event messages, as identified by the parameters "schemeIdUri" and "value". This API will also enable the DAA to subscribe to event data associated with interactivity tracks, if available. In addition, the DAA specifies whether the delivery mode of those Event Stream messages should be "immediate" (i.e., provided as quickly as possible upon availability), or "deferred" (i.e., provided just before the time of the associated media play-out as represented by the Event's "presentationTime" parameter as defined in ISO/IEC 23008-1, sections 5.10.2 and 5.10.3).

APIs 5 and 7 (and associated acknowledgment from the DASH client via APIs 6 and 8) enable the DAA to uniquely subscribe for the notification-based delivery of inband Event Streams which pertain to the signaling and metadata carriage of service interactivity events, i.e., 'emsg' boxes inband to media delivery, and the notification-based delivery of MPD Event messages, respectively, as identified by the parameters "schemeIdUri" and "value". Similar to API 5, the DAA will specify in addition whether the delivery mode of those Event Stream messages should be "immediate" (i.e., provided as quickly as possible upon availability), or "deferred" (i.e., provided just before the time of the associated media play-out as represented by the Event's "presentationTime" parameter as defined in ISO/IEC 23008-1, sections 5.10.2 and 5.10.3).

APIs 9, 11 and 13 (and corresponding response regarding reception by the DAA via APIs 10, 12 and 14) represent the notification and forwarding functions whereby the DASH client, upon having received the corresponding subscription request from the DAA (via APIs 3, 5 and 7 respectively), delivers the appropriate type(s) of interactivity-specific DASH Event Stream messages to the DAA, in accordance to the requested delivery mode (immediate or deferred) by the DAA.

API 15 (and associated response from the DASH client via API 16) enables the DAA to un-subscribe for the notification-based delivery of any type of Event Streams which pertain to the signaling and metadata carriage of service interactivity events, i.e., 'emsg' boxes inband to media delivery, or MPD Event messages, as identified by the parameters "schemeIdUri" and "value".

APIs 17 and 19 (and paired APIs 18 and 20) correspond to converse functionality of APIs 5 and 7, i.e., the un-subscription to notification delivery of inband Event Streams which pertain to the signaling and metadata carriage of service interactivity events, i.e., 'emsg' boxes inband to media delivery, and the notification delivery of MPD Event messages, respectively, as identified by the parameters "schemeIdUri" and "value".

API 21 (and associated response from the DASH client via API 22) enable the DAA to subscribe to notification delivery of the Timed Metadata Track as identified by "track_id".

API 23 (and associated response from the DASH client via API 24) represent the notification and forwarding functions whereby the DASH client, upon having acquired the Timed Metadata Track, as identified by the previously provided "track_id", from the ISO BMFF file, delivers the contents of that track to the DAA.

API 25 (and associated response from the DASH client via API 26) enables the DAA to un-subscribe for the notification delivery of the Timed Metadata Track.

API 27 (and associated response from the DAA via API 28) enables the DASH client, based on information contained in the MPD, to instruct the DAA on which interactivity usage metrics should be measured by the DAA, along with the desired format of the subsequent interactivity usage measurements by the DAA to be reported back to the DASH client.

API 29 enables the forwarding by the DAA to the DASH client of interactivity usage log information from the DAA, for subsequent uploading to a network server function. This API is invoked each time the DAA has a segment of its interactivity usage log, containing measurements according to the metrics and data format as indicated in API 27, to be passed to the DASH client, and therefore may be called multiple times during the presentation of a program containing multiple episodes of service interactivity. API 30 corresponds to the response from the DASH client regarding the outcome of the interactivity usage information forwarding from the DAA.

APIs 31 and 32 correspond to converse functionality of APIs 1 and 2, i.e., the de-registration of the DAA to the DASH client to terminate the association between the two entities with regards to acquisition of interactivity-specific DASH Event Stream information, Timed Web Asset Track, or interactivity usage log forwarding functionality.

For all of the API calls associated with response to a requested action, success or error condition should be returned to the peer, and in the case of an error condition, inclusion of a reason code.

The semantics and parameters of these APIs are similar to the MBMS-APIs as defined in 3GPP TS 26.347, with the difference that the ones defined in that spec exist between an MBMS Aware Application and the MBMS client function, whereas the ones above exist between a DASH Aware Application and the DASH client. In addition, similar to the MBMS-APIs as specified in TS 26.347, the DASH APIs exposes to the DAA a set of simple interfaces as described in the form of IDL (Interface Descriptive Language) definitions; in particular, the IDL makes use of callback functions as the means for the DASH client to notify the applications of events, especially DASH Event messages, as received by the DASH client from the MPD or inband to the media delivery. The programmatic library communication with the DASH client is implementation-specific, and can be implemented using different solution approaches (e.g., smartphone High-Level Operating System services, Web-Sockets, etc.).

The sequence of transactions between the DAA and DASH client, taking for example the invocation of the inband Event Stream subscription and notification APIs, is as follows:

i. The DAA uses the "registerInteracApp( )" to register to the DASH client as the means to enable subsequent invocation of the DASH-APIs pertaining to Event Stream subscription or interactivity usage log forwarding.

ii. The DAA invokes the "inbandEventSubscribe( )" API to request for delivery from the DASH client incoming inband Event Stream messages identified by the filter parameters "schemeIdUri" and "value", and the desired delivery mode (immediate or deferred).

iii. The DASH client obtains inband Event Stream messages contained in 'emsg' boxes via with matching values for "schemeIdUri" and "value", and forwards them to the DAA in accordance to the requested delivery mode (immediate or deferred).

iv. The DAA returns a response to the DASH client indicating whether the inband Event Stream delivery is successful, and if not, a reason code for the error condition is included.

The following example message flow diagrams depict the expected interaction between the DAA and the DASH client in the invocation of the above APIs.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A particular media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 130 that implements techniques for streaming media data over a network according to the techniques of this disclosure. In this example, system 130 includes content preparation device 140, server device 160, and client device 180. Client device 180 and server device 160 are communicatively coupled by network 174, which may comprise the Internet. In some examples, content preparation device 140 and server device 160 may also be coupled by network 174 or another network, or may be directly communicatively coupled. In some examples, content preparation device 140 and server device 160 may comprise the same device.

Content preparation device 140, in the example of FIG. 1, comprises audio source 142 and video source 144. Audio source 142 may comprise, for example, a microphone that produces electrical signals representative of captured audio data to be encoded by audio encoder 146. Alternatively, audio source 142 may comprise a storage medium storing previously recorded audio data, an audio data generator such as a computerized synthesizer, or any other source of audio data. Video source 144 may comprise a video camera that produces video data to be encoded by video encoder 148, a storage medium encoded with previously recorded video data, a video data generation unit such as a computer graphics source, or any other source of video data. Content preparation device 140 is not necessarily communicatively coupled to server device 160 in all examples, but may store multimedia content to a separate medium that is read by server device 160.

Raw audio and video data may comprise analog or digital data. Analog data may be digitized before being encoded by audio encoder 146 and/or video encoder 148. Audio source 142 may obtain audio data from a speaking participant while the speaking participant is speaking, and video source 144 may simultaneously obtain video data of the speaking participant. In other examples, audio source 142 may comprise a computer-readable storage medium comprising stored audio data, and video source 144 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 142 contemporaneously with video data captured (or generated) by video source 144 that is contained within the video frames. For example, while a speaking participant generally produces audio data by speaking, audio source 142 captures the audio data, and video source 144 captures video data of the speaking participant at the same time, that is, while audio source 142 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 146 may encode a timestamp in each encoded audio frame that represents a time at which the audio data for the encoded audio frame was recorded, and similarly, video encoder 148 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 140 may include an internal clock from which audio encoder 146 and/or video encoder 148 may generate the timestamps, or that audio source 142 and video source 144 may use to associate audio and video data, respectively, with a timestamp.

In some examples, audio source 142 may send data to audio encoder 146 corresponding to a time at which audio data was recorded, and video source 144 may send data to video encoder 148 corresponding to a time at which video data was recorded. In some examples, audio encoder 146 may encode a sequence identifier in encoded audio data to indicate a relative temporal ordering of encoded audio data but without necessarily indicating an absolute time at which the audio data was recorded, and similarly, video encoder 148 may also use sequence identifiers to indicate a relative temporal ordering of encoded video data. Similarly, in some examples, a sequence identifier may be mapped or otherwise correlated with a timestamp.

Audio encoder 146 generally produces a stream of encoded audio data, while video encoder 148 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in the example of H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 150 of content preparation device 140 receives elementary streams comprising coded video data from video encoder 148 and elementary streams comprising coded audio data from audio encoder 146. In some examples, video encoder 148 and audio encoder 146 may each include packetizers for forming PES packets from encoded data. In other examples, video encoder 148 and audio encoder 146 may each interface with respective packetizers for forming PES packets from encoded data. In still other examples, encapsulation unit 150 may include packetizers for forming PES packets from encoded audio and video data.

Video encoder 148 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 150 is responsible for assembling elementary streams into video files (e.g., segments) of various representations.

Encapsulation unit 150 receives PES packets for elementary streams of a representation from audio encoder 146 and video encoder 148 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 150 may form a manifest file, such as a media presentation descriptor (MPD) that describes characteristics of the representations. Encapsulation unit 150 may format the MPD according to extensible markup language (XML).

Encapsulation unit 150 may provide data for one or more representations of multimedia content, along with the manifest file (e.g., the MPD) to output interface 152. Output interface 152 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 150 may provide data of each of the representations of multimedia content to output interface 152, which may send the data to server device 160 via network transmission or storage media. In the example of FIG. 1, server device 160 includes storage medium 162 that stores various multimedia contents 164, each including a respective manifest file 166 and one or more representations 168A-168N (representations 168). In some examples, output interface 152 may also send data directly to network 174.

In some examples, representations 168 may be separated into adaptation sets. That is, various subsets of representations 168 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 166 may include data indicative of the subsets of representations 168 corresponding to particular adaptation sets, as well as common characteristics for the adaptation sets. Manifest file 166 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 166.

Server device 160 includes request processing unit 170 and network interface 172. In some examples, server device 160 may include a plurality of network interfaces. Furthermore, any or all of the features of server device 160 may be implemented on other devices of a content delivery network, such as routers, bridges, proxy devices, switches, or other devices. In some examples, intermediate devices of a content delivery network may cache data of multimedia content 164, and include components that conform substantially to those of server device 160. In general, network interface 172 is configured to send and receive data via network 174.

Request processing unit 170 is configured to receive network requests from client devices, such as client device 180, for data of storage medium 162. For example, request processing unit 170 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 170 may be configured to receive HTTP GET or partial GET requests and provide data of multimedia content 164 in response to the requests. The requests may specify a segment of one of representations 168, e.g., using a URL of the segment. In some examples, the requests may also specify one or more byte ranges of the segment, thus comprising partial GET requests. Request processing unit 170 may further be configured to service HTTP HEAD requests to provide header data of a segment of one of representations 168. In any case, request processing unit 170 may be configured to process the requests to provide requested data to a requesting device, such as client device 180.

Additionally or alternatively, request processing unit 170 may be configured to deliver media data via a broadcast or multicast protocol, such as eMBMS. Content preparation device 140 may create DASH segments and/or sub-segments in substantially the same way as described, but server device 160 may deliver these segments or sub-segments using eMBMS or another broadcast or multicast network transport protocol. For example, request processing unit 170 may be configured to receive a multicast group join request from client device 180. That is, server device 160 may advertise an Internet protocol (IP) address associated with a multicast group to client devices, including client device 180, associated with particular media content (e.g., a broadcast of a live event). Client device 180, in turn, may submit a request to join the multicast group. This request may be propagated throughout network 174, e.g., routers making up network 174, such that the routers are caused to direct traffic destined for the IP address associated with the multicast group to subscribing client devices, such as client device 180.

As illustrated in the example of FIG. 1, multimedia content 164 includes manifest file 166, which may correspond to a media presentation description (MPD). In the case of an MPD, corresponding to the DASH standard, manifest file 166 may also include directive on what metrics a client may collect and report to a specified server. Manifest file 166 may contain descriptions of different alternative representations 168 (e.g., video services with different qualities) and the description may include, e.g., codec information, a profile value, a level value, a bitrate, and other descriptive characteristics of representations 168. Client device 180 may retrieve the MPD of a media presentation to determine how to access segments of representations 168.

In particular, retrieval unit 192 may retrieve configuration data (not shown) of client device 180 to determine decoding capabilities of video decoder 188 and rendering capabilities of video output 184. The configuration data may also include any or all of a language preference selected by a user of client device 180, one or more camera perspectives corresponding to depth preferences set by the user of client device 180, and/or a rating preference selected by the user of client device 180. Retrieval unit 192 may comprise, for example, a web browser or a media client configured to submit HTTP GET and partial GET requests. Retrieval unit 192 may correspond to software instructions executed by one or more processors or processing units (not shown) of client device 180. In some examples, all or portions of the functionality described with respect to retrieval unit 192 may be implemented in hardware, or a combination of hardware, software, and/or firmware, where requisite hardware may be provided to execute instructions for software or firmware.

Retrieval unit 192 may compare the decoding and rendering capabilities of client device 180 to characteristics of representations 168 indicated by information of manifest file 166. Retrieval unit 192 may initially retrieve at least a portion of manifest file 166 to determine characteristics of representations 168. For example, retrieval unit 192 may request a portion of manifest file 166 that describes characteristics of one or more adaptation sets. Retrieval unit 192 may select a subset of representations 168 (e.g., an adaptation set) having characteristics that can be satisfied by the coding and rendering capabilities of client device 180. Retrieval unit 192 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 192 may retrieve data from relatively high bitrate representations, whereas when available network bandwidth is low, retrieval unit 192 may retrieve data from relatively low bitrate representations. In this manner, client device 180 may stream multimedia data over network 174 while also adapting to changing network bandwidth availability of network 174.

Additionally or alternatively, retrieval unit 192 may be configured to receive data in accordance with a broadcast or multicast network protocol, such as MBMS, eMBMS, or IP multicast. In such examples, retrieval unit 192 may submit a request to join a multicast network group associated with particular media content. After joining the multicast group, retrieval unit 192 may receive data of the multicast group without further requests issued to server device 160 or content preparation device 140. Retrieval unit 192 may submit a request to leave the multicast group when data of the multicast group is no longer needed, e.g., to stop playback or to change channels to a different multicast group.

Network interface 194 may receive and provide data of segments of a selected representation to retrieval unit 192, which may in turn provide the segments to decapsulation unit 190. Decapsulation unit 190 may decapsulate elements of a video file into constituent PES streams, depacketize the PES streams to retrieve encoded data, and send the encoded data to either audio decoder 186 or video decoder 188, depending on whether the encoded data is part of an audio or video stream, e.g., as indicated by PES packet headers of the stream. Audio decoder 186 decodes encoded audio data and sends the decoded audio data to audio output 182, while video decoder 188 decodes encoded video data and sends the decoded video data, which may include a plurality of views of a stream, to video output 184.

Video encoder 148, video decoder 188, audio encoder 146, audio decoder 186, encapsulation unit 150, retrieval unit 192, request processing unit 170, and decapsulation unit 190 each may be implemented as any of a variety of suitable fixed and/or programmable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 148 and video decoder 188 may be included in one or more encoders or decoders, either of which may be integrated as part of a combined video encoder/decoder (CODEC). Likewise, each of audio encoder 146 and audio decoder 186 may be included in one or more encoders or decoders, either of which may be integrated as part of a combined CODEC. An apparatus including video encoder 148, video decoder 188, audio encoder 146, audio decoder 186, encapsulation unit 150, retrieval unit 192, request processing unit 170, and/or decapsulation unit 190 may comprise an integrated circuit, a microprocessor, and/or a wireless communication device, such as a cellular telephone.

Client device 180, server device 160, and/or content preparation device 140 may be configured to operate in accordance with the techniques of this disclosure. For purposes of example, this disclosure describes these techniques with respect to client device 180 and server device 160. However, it should be understood that content preparation device 140 may be configured to perform these techniques, instead of (or in addition to) server device 160.

Encapsulation unit 150 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 150 may receive encoded video data from video encoder 148 in the form of PES packets of elementary streams. Encapsulation unit 150 may associate each elementary stream with a corresponding program.

Encapsulation unit 150 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 166. Client device 180 may retrieve the MPD of a media presentation to determine how to access movie fragments of various presentations. Movie fragments may be located in movie fragment boxes (moof boxes) of video files.

Manifest file 166 (which may comprise, for example, an MPD) may advertise availability of segments of representations 168. That is, the MPD may include information indicating the wall-clock time at which a first segment of one of representations 168 becomes available, as well as information indicating the durations of segments within representations 168. In this manner, retrieval unit 192 of client device 180 may determine when each segment is available, based on the starting time as well as the durations of the segments preceding a particular segment.

After encapsulation unit 150 has assembled NAL units and/or access units into a video file based on received data, encapsulation unit 150 passes the video file to output interface 152 for output. In some examples, encapsulation unit 150 may store the video file locally or send the video file to a remote server via output interface 152, rather than sending the video file directly to client device 180. Output interface 152 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 152 outputs the video file to a computer-readable medium, such as, for example, a transmission signal, a magnetic medium, an optical medium, a memory, a flash drive, or other computer-readable medium.

Network interface 194 may receive a NAL unit or access unit via network 174 and provide the NAL unit or access unit to decapsulation unit 190, via retrieval unit 192. Decapsulation unit 190 may decapsulate a elements of a video file into constituent PES streams, depacketize the PES streams to retrieve encoded data, and send the encoded data to either audio decoder 186 or video decoder 188, depending on whether the encoded data is part of an audio or video stream, e.g., as indicated by PES packet headers of the stream. Audio decoder 186 decodes encoded audio data and sends the decoded audio data to audio output 182, while video decoder 188 decodes encoded video data and sends the decoded video data, which may include a plurality of views of a stream, to video output 184.

As discussed in greater detail below, retrieval unit 192 may include or be executed by one or more processing units including circuitry. Retrieval unit 192 (and more particularly, the processing units thereof) may execute a DASH aware application and a DASH client. As discussed below, the DASH aware application and the DASH client may exchange data using one or more of a variety of application programming interfaces (APIs). The APIs may allow the DASH aware application to subscribe to DASH events and/or timed web asset track data, and to report time usage of interactive-related content included in, e.g., DASH events to the DASH client. The DASH client, likewise, may receive DASH event data and/or timed web asset track data and deliver this received data to the DASH aware application via the APIs, and may receive reporting data from the DASH aware application via the APIs.

Figure 2:
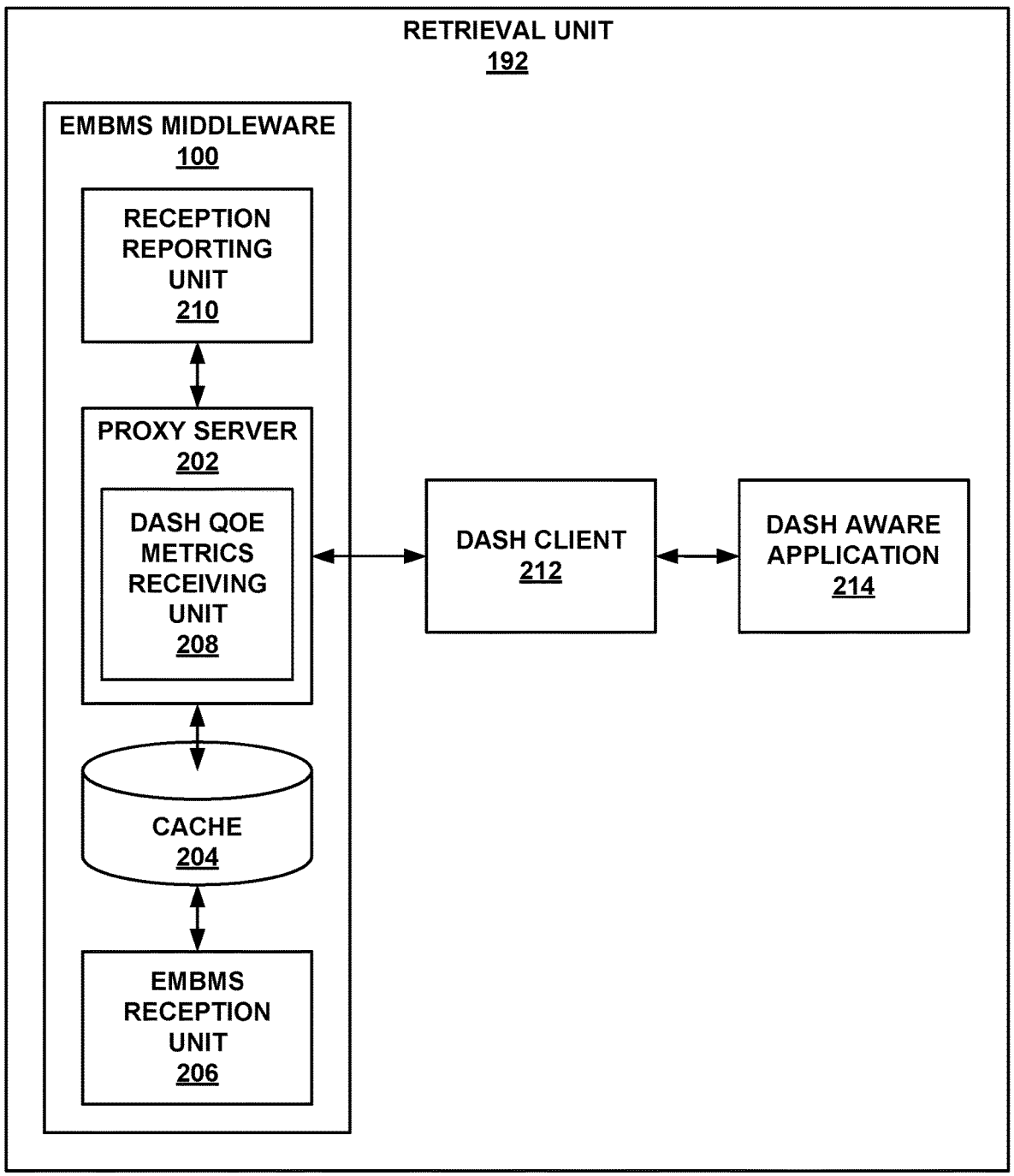
FIG. 2 is a block diagram illustrating an example set of components of a retrieval unit of FIG. 1 in greater detail.

FIG. 2 is a block diagram illustrating an example set of components of retrieval unit 192 of FIG. 1 in greater detail. In this example, retrieval unit 192 includes eMBMS middleware unit 200, DASH client 212, and DASH aware application (DAA) 214. DAA 214 may also represent a media application.

In this example, eMBMS middleware unit 200 further includes eMBMS reception unit 206, cache 204, proxy/local server 202, and reception reporting unit 210. In this example, eMBMS reception unit 206 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726, or Real-Time Object Delivery over Unidirectional Transport (ROUTE) protocol. That is, eMBMS reception unit 206 may receive files via broadcast from, e.g., server device 160 of FIG. 1, which may act as a BM-SC.

As eMBMS middleware unit 200 receives data for files, eMBMS middleware unit may store the received data in cache 204. Cache 204 may comprise a computer-readable storage medium, such as flash memory, a hard disk, RAM, or any other suitable storage medium.

Proxy server 202 may act as an HTTP server for DASH client 212. For example, middleware may modify the MPD file or other manifest file to DASH client 212. Middleware 200 would advertise adjusted availability times for segments in the MPD file, as well as hyperlinks from which the segments can be retrieved locally. These hyperlinks may include a localhost address prefix corresponding to client device 180 of FIG. 1 (e.g., 127.0.0.1 for IPv4). In this manner, DASH client 212 may request segments from proxy server 202 using HTTP GET or partial GET requests. For example, for a segment available from link http://127.0.0.1/rep1/seg3, DASH client 212 may construct an HTTP GET request that includes a request for http://127.0.0.1/rep1/seg3, and submit the request to proxy server 202. Proxy server 202 may retrieve requested data from cache 204 and provide the data to DASH client 212 in response to such requests. Alternatively, eMBMS middleware unit 200 need not modify the URLs in the MPD and act as a proxy. Requests targeted for the DASH Server 170, are intercepted by eMBMS middleware unit 200 and served from the local cache.

In accordance with one example, proxy server 202 also includes DASH QoE metrics receiving unit 208. DASH QoE metrics receiving unit 208 is generally configured to intercept (in the case of proxy, note that proxy server 202 may optionally let reports through to a DASH measurement server) or receive (when acting as a local server) DASH reports from the DASH Client e.g. accepting HTTP post commands. DASH QoE metrics receiving unit 208 then forwards the DASH reports, or information thereof, to reception reporting unit 210, which then may report DASH QoE metrics on behalf of DASH client 212 to a server device (e.g., server device 160 of FIG. 1, or a separate reporting) server and/or may include the DASH QoE measurement report in a reception report. For example, DASH QoE metrics receiving unit 208 may receive QoE metrics from DASH client 212.

Proxy server 202 may be configured to receive HTTP POST commands from DASH client 212 including DASH QoE metrics in accordance with a media presentation description (MPD) or other manifest file. Furthermore, reception reporting unit 210 reports reception in accordance with, e.g., eMBMS. In some examples, reception reporting unit 210 sends a single report including both DASH QoE metrics and eMBMS reception reports. In other examples, reception reporting unit 210 sends separate reports for eMBMS reception reports and DASH QoE metrics.

After receiving a DASH QoE measurement report from DASH client 212, reception reporting unit 210 may report the DASH QoE metrics to a server device, along with reception reports related to a protocol by which eMBMS middleware unit 200 reports on the reception of files encapsulating the DASH data. In addition, in some examples, one or both of eMBMS middleware unit 200 and/or DASH client 212 may be configured to also report DASH QoE metrics to a dedicated DASH metrics server.

Server device 160 (FIG. 1) may also include a BMSC function that delivers a service announcement to eMBMS middleware unit 200. According to the techniques of this disclosure, the service announcement may further include directives on the type and contents of the desired DASH QoE measurement report. For example, the Associated Delivery Procedure (ADP) fragment of the service announcement may include new fields and elements that describe the desired metrics for the DASH QoE report, as well as other parameter. An example implementation is later described in FIGS. 9 and 10 below. In a more general sense, the DASH QoE collection directives may be delivered through other means, e.g., OMA DM, a configuration file, the original MPD itself, or any other means.

EMBMS middleware unit 200 may then communicate the above directives to DASH client 212. One method for communicating these directives is that eMBMS middleware unit 200 may modify the MPD hosted locally (except in the case where the original MPD carries the directives, in which case eMBMS middleware unit 200 need not modify the MPD) to reflect the metrics collection parameters obtained from server device 160 of FIG. 1.

In another example, eMBMS middleware unit 200 may modify the MPD to collect the desired metrics or a superset of the metrics, and to always report to eMBMS middleware unit 200. EMBMS middleware unit 200 can then reduce the metrics to the set requested by server device 160, and report with the probability requested by server device 160.

In accordance with the techniques of this disclosure, and as described in greater detail below, DAA 214 and DASH client 212 may be configured to exchange data via one or more APIs, such as any or all of APIs 1-30 as discussed above. For example, in general, DAA 214 may subscribe to DASH events (e.g., in-band or MPD-based) via a first API, and DASH client 212 may deliver DASH event data to DAA 214 via a second API. The DASH events may include interactive-related content, such as data for voting, rating, purchasing, chatting, or targeted advertisements. DAA 214 may further be configured to monitor how long a user interacts with the interactive-related content and provide data representing the amount of time the user interacts with the interactive-related content via another API to DASH client 212. Moreover, DAA 214 may subscribe to timed web asset track data via yet another API to DASH client 212, and DASH client 212 may deliver timed web asset track data to DAA 214 for presentation via another API.

DASH aware application 214 may measure usage of interactivity-related content and submit reports to DASH client 212 representing the measurements. For example, DASH aware application 214 may generate an interactivity summary in accordance with Table 1 below:

TABLE 1

| Key | Type | Description |
| --- | --- | --- |
| IntySummary | Object | Summarized information on interactivity usage associated with the set of interactivity events summarized by an interactivity usage report |
|   Parameters | List | Collection of one or more parameters pertaining to interactivity usage |
|     consumptionDuration | Integer | Total measured time duration in milliseconds of user consumption of rendered interactivity content (e.g., video or audio) |
|     engagementInterval | Integer | Total measured time duration in milliseconds of user engagement with interactivity content via UI controls |
|     clickthroughStart | List | List of start times, by media presentation time, of click-through actions associated with user access of interactivity-related resources offered by UI controls |
|     PrivateExt | List | Container for proprietary or application-specific extensions on parameters to be included in the interactivity usage report |

Additionally or alternatively, DASH aware application 214 may generate an interactivity event list including a time-ordered list of interactivity usage events and measured interactivity usage information during each even, in accordance with Table 2 below:

TABLE 2

| IntyEventList | List | A time-ordered list of interactivity events occurring during the playout of the main program, each containing detailed information on the incidences of interactivity usage during that event, as covered by an instance of the interactivity usage report. |
| --- | --- | --- |
|   Entry | Object | A record of a single interactivity event |
|     mStart | Media Time | The media presentation time at the start of the interactivity event. |
|     mStop | Media Time | The media presentation time at the end of the interactivity event |
|     Rendering | List | A list of time intervals within the duration of an interactivity event during which the user consumes the rendered interactivity content (e.g., video or audio) |
|       rStart | Media Time | The media presentation time at the start of interactivity content rendering resulting from, for example, the user's click of an embedded hyperlink, or engagement with UI controls, present in an advertisement that is initially displayed during an interactivity event |
|       rStop | Media Time | The media presentation time at the end of consumption of interactivity content as measured by the time of conclusion of that content, or when the user selects another interactivity content item for rendering, whichever occurs earlier |
|     Engagement | List | A list of time occurrences within the duration of an interactivity event at which the user engages with the interactivity content via UI controls |
|       eStart | Media Time | The media presentation time at the start of user engagement with interactivity content via UI controls via UI controls |
|     Clickthrough | List | A list of click-through actions performed by the user to access interactivity-related resources, as denoted by embedded hyperlinks in the interactivity content |
|       cStart | Media Time | The media presentation time at which user performs a click/selection |

TABLE 2-continued

| PrivateExt | List | Container for proprietary or application-specific extensions on parameters to be included in this interactivity event entry |

In this manner, DASH client 212 may submit instructions to DASH aware application 214 representing information regarding usage of interactivity-related content to be measured. DASH aware application 214 may, in turn, receive the instructions, measure data representing usage of the interactivity-related content, and submit a report including the measured data to DASH client 212 according to the instructions. DASH client 212 may, in turn, send the report to a reporting server device, such as server device 60 (FIG. 1) or a separate server device.

Figure 3:
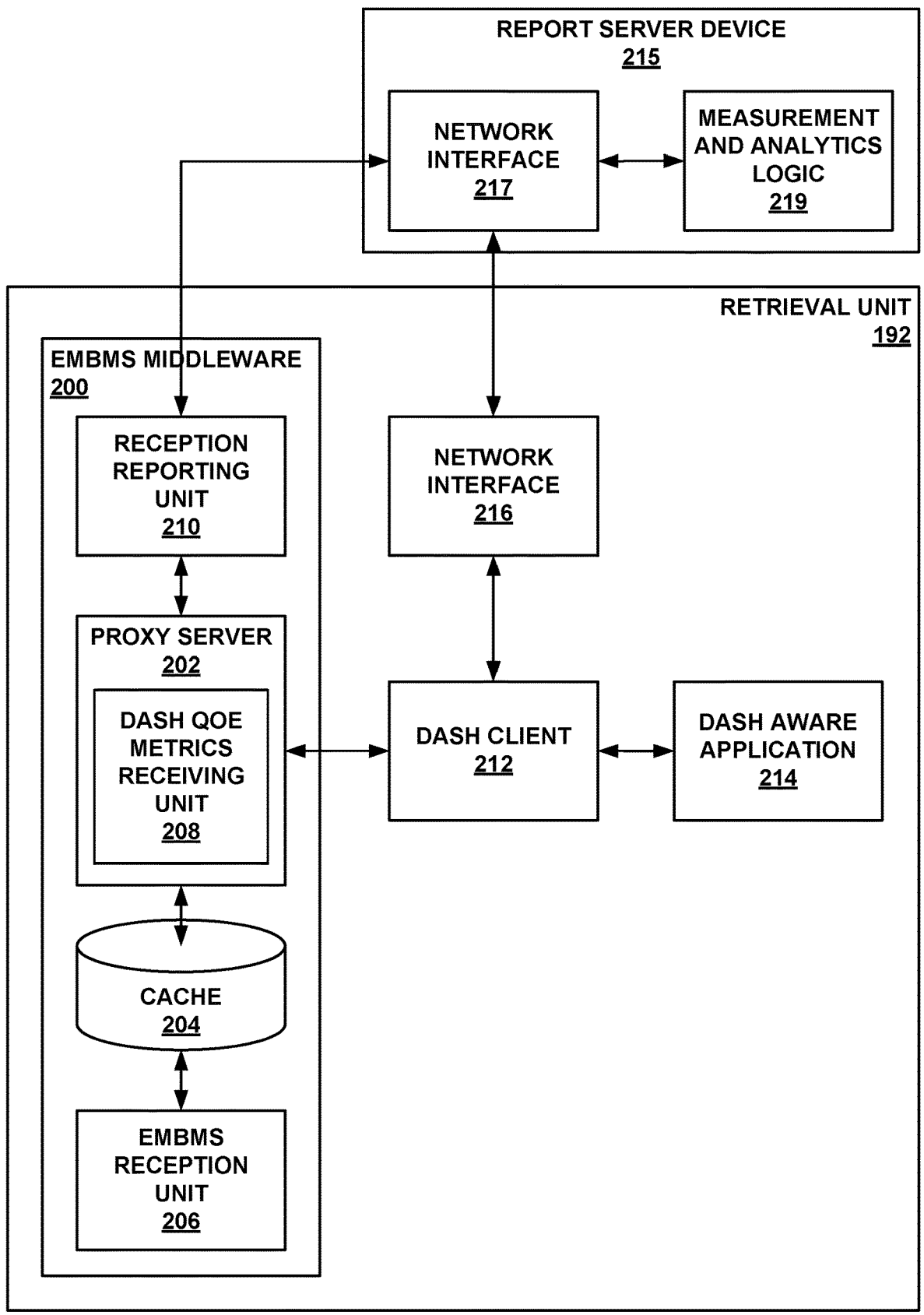
FIG. 3 is a block diagram illustrating an example retrieval unit and various mechanisms by which a DASH client thereof may submit reports to a report server device.

FIG. 3 is a block diagram illustrating an example retrieval unit 192' and various mechanisms by which DASH client 212 may submit reports to report server device 215. Retrieval unit 192' corresponds substantially to the example of retrieval unit 192 of FIG. 2, except that retrieval unit 192' also includes network interface 216. In this example, DASH client 212 may communicate with other network devices, such as report server device 215, via network interface 216, which avoids the use of eMBMS middleware unit 200. Thus, in some examples, DASH client 212 may submit reports regarding received media data to report server device 215 via network interface 216, instead of via eMBMS middleware unit 200. In some examples, network interface 216 may represent a network interface module configured to interact with network interface 194 of FIG. 1.

In other examples, however, DASH client 212 may submit such reports to report server device 215 via eMBMS middleware unit 200. In particular, DASH client 212 may submit the reports to proxy server unit 202, which may direct the reports to reception reporting unit 210. Reception reporting unit 210 may, in turn, submit the reports to report server device 215.

In this example, report server device 215 includes network interface 217 and measurement and analytics logic 219. In general, network interface 217 provides an interface by which report server device 215 sends and receives data via a network, such as a network interface card (NIC) to provide Ethernet connectivity. Measurement and analytics logic 219 generally analyzes data of reports received from client device 40 of FIG. 1 (and in particular, DASH client 212 of retrieval unit 192' thereof), and other client devices. Administrators or other users may use the analyzed data to determine, e.g., which types of media data to be offered, whether media data was consumed using broadcast or multicast, effectiveness of various types of interactive data presented along with media data, and the like. For instance, measurement and analytics logic 219 may aggregate data related to votes, ratings, purchases, chatting, or interaction with targeted advertisements (e.g., hyperlink click-throughs) for a variety of users operating respective client devices. From such data, administrators may generally determine whether various interactivity-related content of DASH events were effective, and compare effectiveness of such interactivity-related content to each other.

Figure 4:
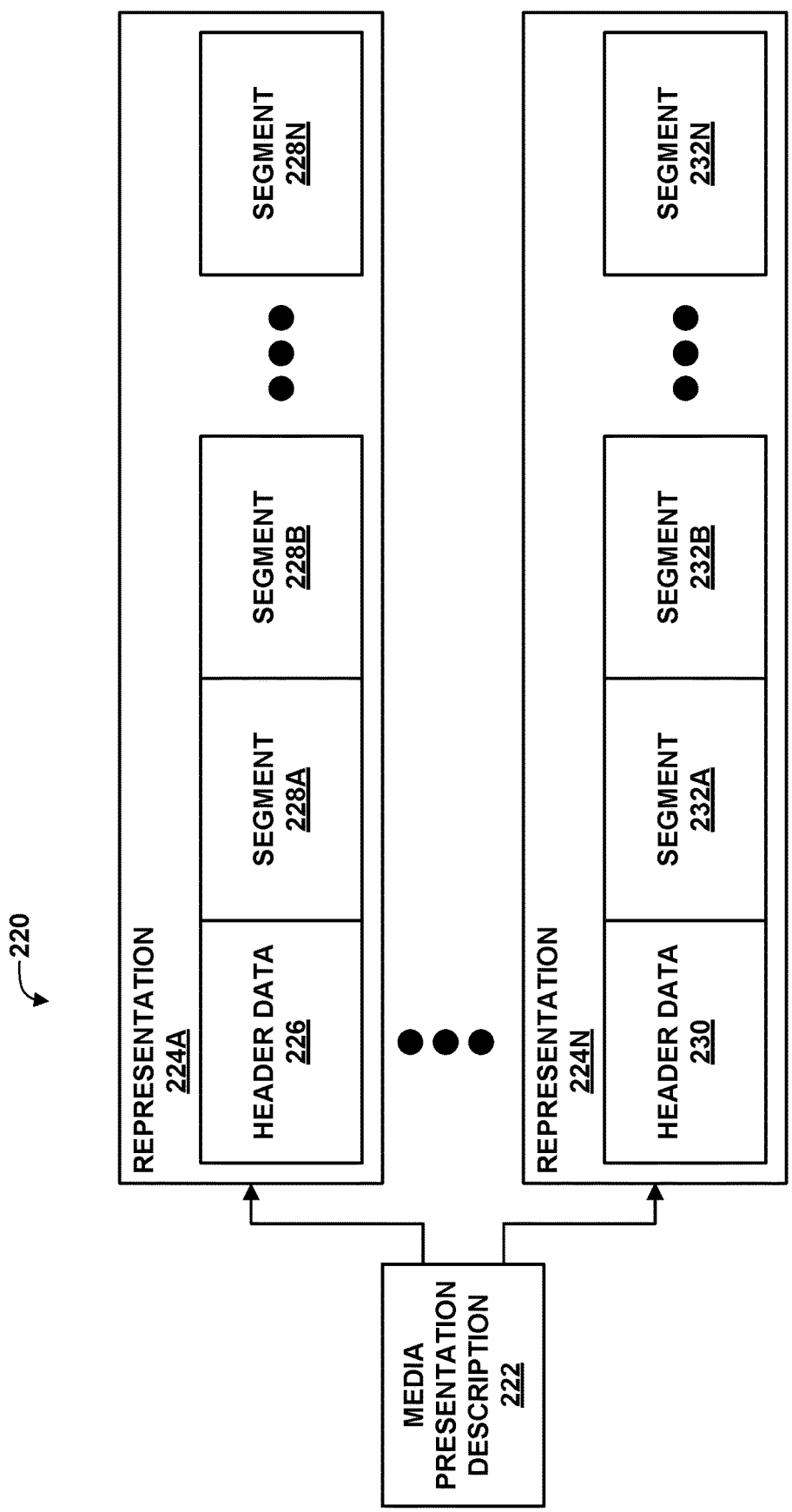
FIG. 4 is a conceptual diagram illustrating elements of example multimedia content.

FIG. 4 is a conceptual diagram illustrating elements of example multimedia content 220. Multimedia content 220 may correspond to multimedia content 164 (FIG. 1), or another multimedia content stored in storage medium 162. In the example of FIG. 4, multimedia content 220 includes media presentation description (MPD) 222 and a plurality of representations 224A-224N (representations 224). Representation 224A includes optional header data 226 and segments 228A-228N (segments 228), while representation 224N includes optional header data 230 and segments 232A-232N (segments 232). The letter N is used to designate the last movie fragment in each of representations 224 as a matter of convenience. In some examples, there may be different numbers of movie fragments between representations 224. MPD 222 may comprise a data structure separate from representations 224. MPD 222 may correspond to manifest file 166 of FIG. 1. Likewise, representations 224 may correspond to representations 168 of FIG. 1. In general, MPD 222 may include data that generally describes characteristics of representations 224, such as coding and rendering characteristics, adaptation sets, a profile to which MPD 222 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 226, when present, may describe characteristics of segments 228, e.g., temporal locations of random access points (RAPs, also referred to as stream access points (SAPs)), which of segments 228 includes random access points, byte offsets to random access points within segments 228, uniform resource locators (URLs) of segments 228, or other aspects of segments 228. Header data 230, when present, may describe similar characteristics for segments 232. Additionally or alternatively, such characteristics may be fully included within MPD 222.

Segments 228, 232 include one or more coded video samples, each of which may include frames or slices of video data. Each of the coded video samples of segments 228 may have similar characteristics, e.g., height, width, and bandwidth requirements. Such characteristics may be described by data of MPD 222, though such data is not illustrated in the example of FIG. 4. MPD 222 may include characteristics as described by the 3GPP Specification, with the addition of any or all of the signaled information described in this disclosure.

Each of segments 228, 232 may be associated with a unique uniform resource locator (URL). Thus, each of segments 228, 232 may be independently retrievable using a streaming network protocol, such as DASH. In this manner, a destination device, such as client device 180 of FIG. 1, may use an HTTP GET request to retrieve segments 228 or 232. In some examples, client device 180 may use HTTP partial GET requests to retrieve specific byte ranges of segments 228 or 232.

In accordance with the techniques of this disclosure, MPD 222 may include data specifying metrics to be reported to a server device, such as server device 160 of FIG. 1 or a separate metrics reporting server device (not shown).

Figure 5:
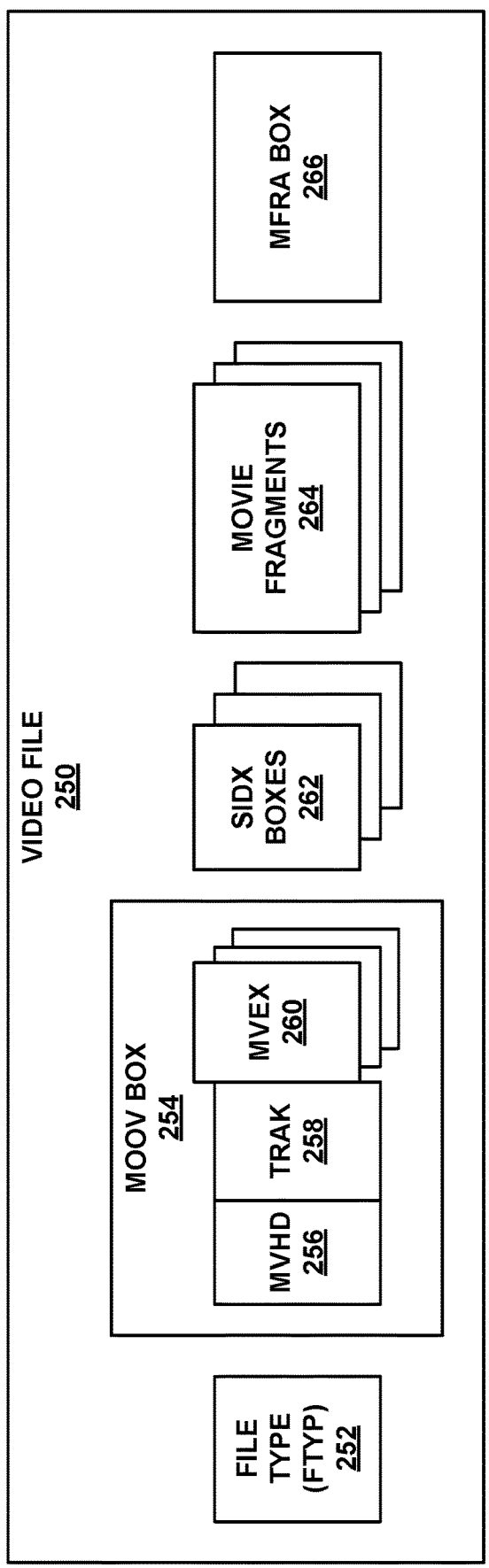
FIG. 5 is a block diagram illustrating elements of an example video file, which may correspond to a segment of a representation.

FIG. 5 is a block diagram illustrating elements of an example video file 250, which may correspond to a segment of a representation, such as one of segments 228, 232 of FIG. 4. Each of segments 228, 232 may include data that conforms substantially to the arrangement of data illustrated in the example of FIG. 5. Video file 250 may be said to encapsulate a segment. As described above, video files in accordance with the ISO base media file format and extensions thereof store data in a series of objects, referred to as "boxes." In the example of FIG. 5, video file 250 includes file type (FTYP) box 252, movie (MOOV) box 254, segment index (sidx) boxes 262, movie fragment (MOOF) boxes 164, and movie fragment random access (MFRA) box 266. Although FIG. 5 represents an example of a video file, it should be understood that other media files may include other types of media data (e.g., audio data, timed text data, or the like) that is structured similarly to the data of video file 250, in accordance with the ISO base media file format and its extensions.

File type (FTYP) box 252 generally describes a file type for video file 250. File type box 252 may include data that identifies a specification that describes a best use for video file 250. File type box 252 may alternatively be placed before MOOV box 254, movie fragment boxes 164, and/or MFRA box 266.

Figure 7:
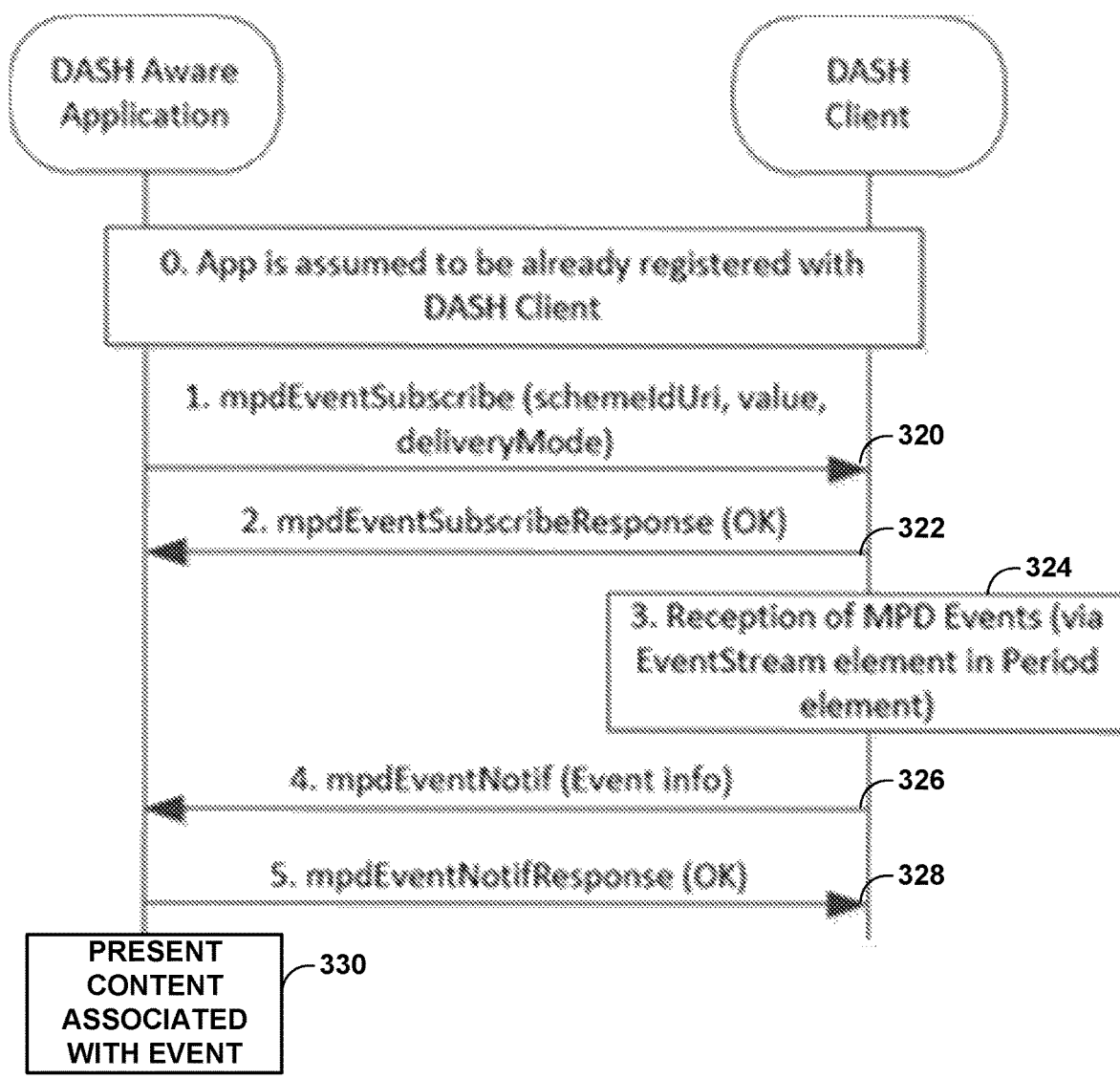
FIG. 7 is a flowchart illustrating an example method of subscription to and notification of MPD Events messages.

In some examples, a Segment, such as video file 250, may include an MPD update box (not shown) before FTYP box 252. The MPD update box may include information indicating that an MPD corresponding to a representation including video file 250 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 250, where the STYP box may define a segment type for video file 250. FIG. 7, discussed in greater detail below, provides additional information with respect to the MPD update box.

MOOV box 254, in the example of FIG. 5, includes movie header (MVHD) box 256, track (TRAK) box 258, and one or more movie extends (MVEX) boxes 260. In general, MVHD box 256 may describe general characteristics of video file 250. For example, MVHD box 256 may include data that describes when video file 250 was originally created, when video file 250 was last modified, a timescale for video file 250, a duration of playback for video file 250, or other data that generally describes video file 250.

TRAK box 258 may include data for a track of video file 250. TRAK box 258 may include a track header (TKHD) box that describes characteristics of the track corresponding to TRAK box 258. In some examples, TRAK box 258 may include coded video pictures, while in other examples, the coded video pictures of the track may be included in movie fragments 264, which may be referenced by data of TRAK box 258 and/or sidx boxes 262.

In some examples, video file 250 may include more than one track. Accordingly, MOOV box 254 may include a number of TRAK boxes equal to the number of tracks in video file 250. TRAK box 258 may describe characteristics of a corresponding track of video file 250. For example, TRAK box 258 may describe temporal and/or spatial information for the corresponding track. A TRAK box similar to TRAK box 258 of MOOV box 254 may describe characteristics of a parameter set track, when encapsulation unit 150 (FIG. 4) includes a parameter set track in a video file, such as video file 250. Encapsulation unit 150 may signal the presence of sequence level SEI messages in the parameter set track within the TRAK box describing the parameter set track.

MVEX boxes 260 may describe characteristics of corresponding movie fragments 264, e.g., to signal that video file 250 includes movie fragments 264, in addition to video data included within MOOV box 254, if any. In the context of streaming video data, coded video pictures may be included in movie fragments 264 rather than in MOOV box 254. Accordingly, all coded video samples may be included in movie fragments 264, rather than in MOOV box 254.

MOOV box 254 may include a number of MVEX boxes 260 equal to the number of movie fragments 264 in video file 250. Each of MVEX boxes 260 may describe characteristics of a corresponding one of movie fragments 264. For example, each MVEX box may include a movie extends header box (MEHD) box that describes a temporal duration for the corresponding one of movie fragments 264.

As noted above, encapsulation unit 150 of FIG. 1 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 150 may include a sequence data set, which may include sequence level SEI messages, in one of movie fragments 264. Encapsulation unit 150 may further signal the presence of a sequence data set and/or sequence level SEI messages as being present in one of movie fragments 264 within the one of MVEX boxes 260 corresponding to the one of movie fragments 264.

SIDX boxes 262 are optional elements of video file 250. That is, video files conforming to the 3GPP file format, or other such file formats, do not necessarily include SIDX boxes 262. In accordance with the example of the 3GPP file format, a SIDX box may be used to identify a sub-segment of a segment (e.g., a segment contained within video file 250). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 262 generally provide information representative of one or more sub-segments of a segment included in video file 250. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 264 may include one or more coded video pictures. In some examples, movie fragments 264 may include one or more groups of pictures (GOPs), each of which may include a number of coded video pictures, e.g., frames or pictures. In addition, as described above, movie fragments 264 may include sequence data sets in some examples. Each of movie fragments 264 may include a movie fragment header box (MFHD, not shown in FIG. 5).

The MFHD box may describe characteristics of the corresponding movie fragment, such as a sequence number for the movie fragment. Movie fragments 264 may be included in order of sequence number in video file 250. In some examples, movie fragments 264 may include data for a timed web asset track and/or interactivity-related content of a DASH event. Such fragments may correspond to a separate track, e.g., as indicated by TRAK box 258.

MFRA box 266 may describe random access points within movie fragments 264 of video file 250. This may assist with performing trick modes, such as performing seeks to particular temporal locations (i.e., playback times) within a segment encapsulated by video file 250. MFRA box 266 is generally optional and need not be included in video files, in some examples. Likewise, a client device, such as client device 180 of FIG. 1, does not necessarily need to reference MFRA box 266 to correctly decode and display video data of video file 250. MFRA box 266 may include a number of track fragment random access (TFRA) boxes (not shown) equal to the number of tracks of video file 250, or in some examples, equal to the number of media tracks (e.g., non-hint tracks) of video file 250.

In some examples, movie fragments 264 may include one or more stream access points (SAPs), such as IDR pictures. Likewise, MFRA box 266 may provide indications of locations within video file 250 of the SAPs. Accordingly, a temporal sub-sequence of video file 250 may be formed from SAPs of video file 250. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 6:
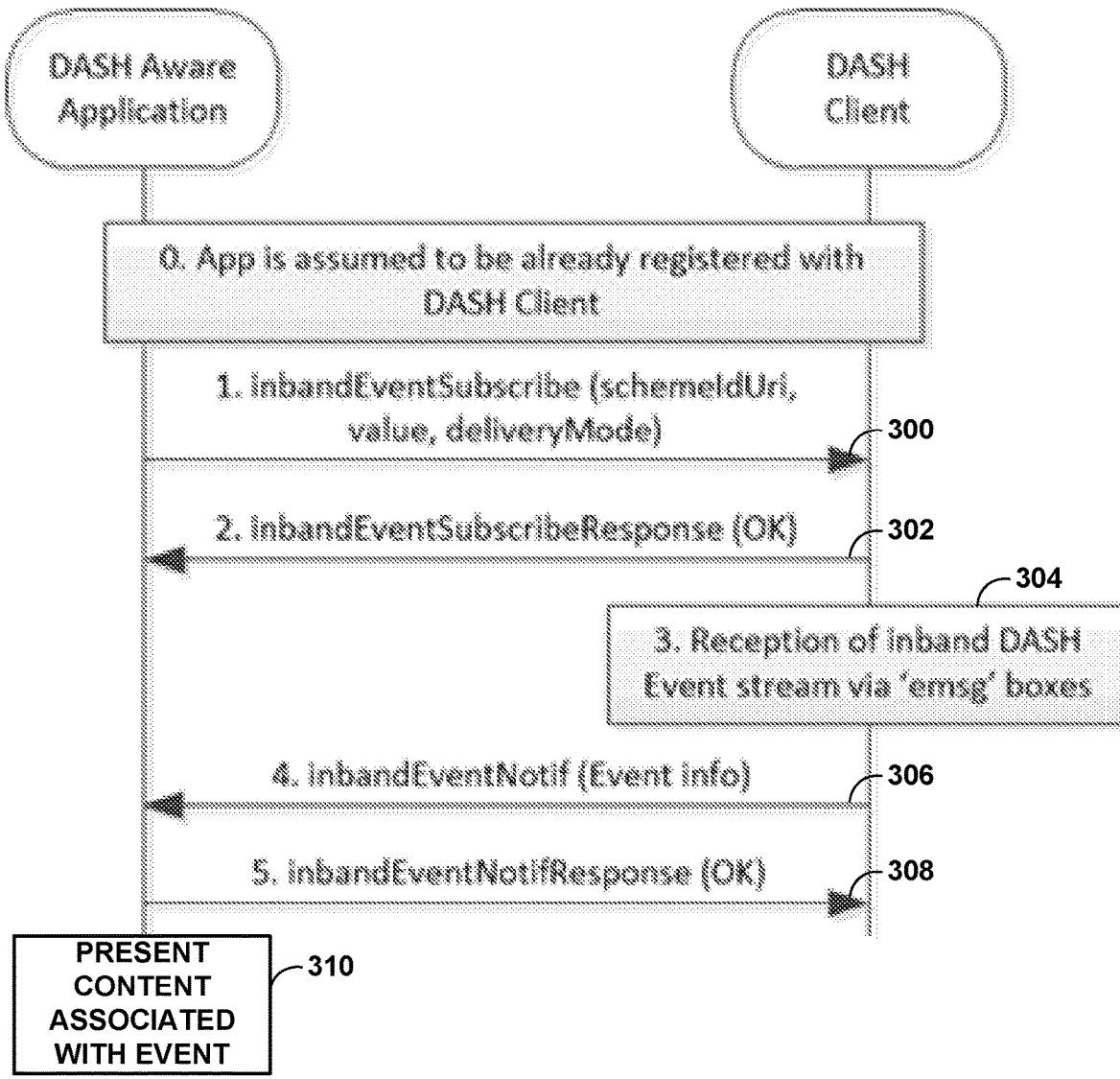
FIG. 6 is a flowchart illustrating an example method of subscription to and notification of in-band DASH Event stream messages.

FIG. 6 is a flowchart illustrating an example method of subscription to and notification of in-band DASH Event stream messages. The method of FIG. 6 is performed by a DASH aware application, such as DASH aware application (DAA) 214 of FIG. 2, and a DASH client, such as DASH client 212 of FIG. 2. DAA 214 is assumed to be already registered with DASH Client 212. Initially, DAA 214 sends a subscription to DASH events via a first application programming interface (API), InbandEventSubsribe (schemeUri, Value, deliveryMode), to DASH Client 212 (300). Next, DASH client 212 sends an inbandEventSubsribeResponse (OK) to DAA 214 (302). Next, DASH Client 212 receives an inband DASH Event stream via 'emsg' boxes (304). The DASH event stream includes data for one or more DASH events, which may specify interactivity-related content as discussed above. Next, DASH Client 212 sends data representing the interactivity-related content via a second interface, inbandEventNotif (Event info), to DAA 214 (306). DAA 214 then sends an inbandEventNotifResopnse (OK) to DASH Client 212 (308). Moreover, DAA 214 may present content associated with the event to the end user (310). For example, DAA 214 may render, to the end-user, contents associated with the interactivity event, such as the interactivity-related content, via a user interface of client device 40, such as video output 184 (FIG. 1).

In this manner, the method of FIG. 6 represents an example of a method including subscribing, by a Dynamic Adaptive Streaming over HTTP (DASH) aware application executed by one or more processors comprising circuitry of a client device, to DASH events of a DASH event stream via a first application programming interface (API) between the DASH aware application and a DASH client executed by the one or more processors; receiving, by the DASH aware application, data for one or more DASH events of the DASH event stream from the DASH client via a second API between the DASH aware application and the DASH client, the data for the one or more DASH events specifying interactivity-related content; and presenting, by the DASH aware application, the interactivity-related content via one or more user interfaces of the client device.

FIG. 7 is a flowchart illustrating an example method of subscription to and notification of MPD Events messages. The method of FIG. 7 is performed by a DASH aware application, such as DASH aware application (DAA) 214 of FIG. 2, and a DASH client, such as DASH client 212 of FIG. 2. DAA 214 is assumed to be already registered with DASH Client 212. Initially, DAA 214 sends a subscription to DASH events via a first application programming interface (API), mpdEventSubscribe (schemeidUri, value, deliveryMode) to DASH Client 212 (320). Next, DASH Client 212 sends an mpdEventSubscribeResponse (OK) to DAA 214 (322). Next, DASH Client 212 receives MPD Events (via EventStream element in Period element) (324). The DASH MPD events include data for one or more DASH events, which may specify interactivity-related content as discussed above. Next, DASH Client 212 sends the data for the one or more DASH events, such as the interactivity-related content, via a second API, mpdEventNotif (Event info), to DAA 214 (326). DAA 214 then sends mpdEventNotifResponse (OK) to DASH Client 212 (328). Moreover, DAA 214 may present content associated with the event to the end user (330). For example, DAA 214 may render, to the end-user, contents associated with the interactivity event, such as the interactivity-related content, via a user interface of client device 40, such as video output 184 (FIG. 1).

In this manner, the method of FIG. 7 represents an example of a method including subscribing, by a Dynamic Adaptive Streaming over HTTP (DASH) aware application executed by one or more processors comprising circuitry of a client device, to DASH events of a DASH event stream via a first application programming interface (API) between the DASH aware application and a DASH client executed by the one or more processors; receiving, by the DASH aware application, data for one or more DASH events of the DASH event stream from the DASH client via a second API between the DASH aware application and the DASH client, the data for the one or more DASH events specifying interactivity-related content; and presenting, by the DASH aware application, the interactivity-related content via one or more user interfaces of the client device.

Figure 8:
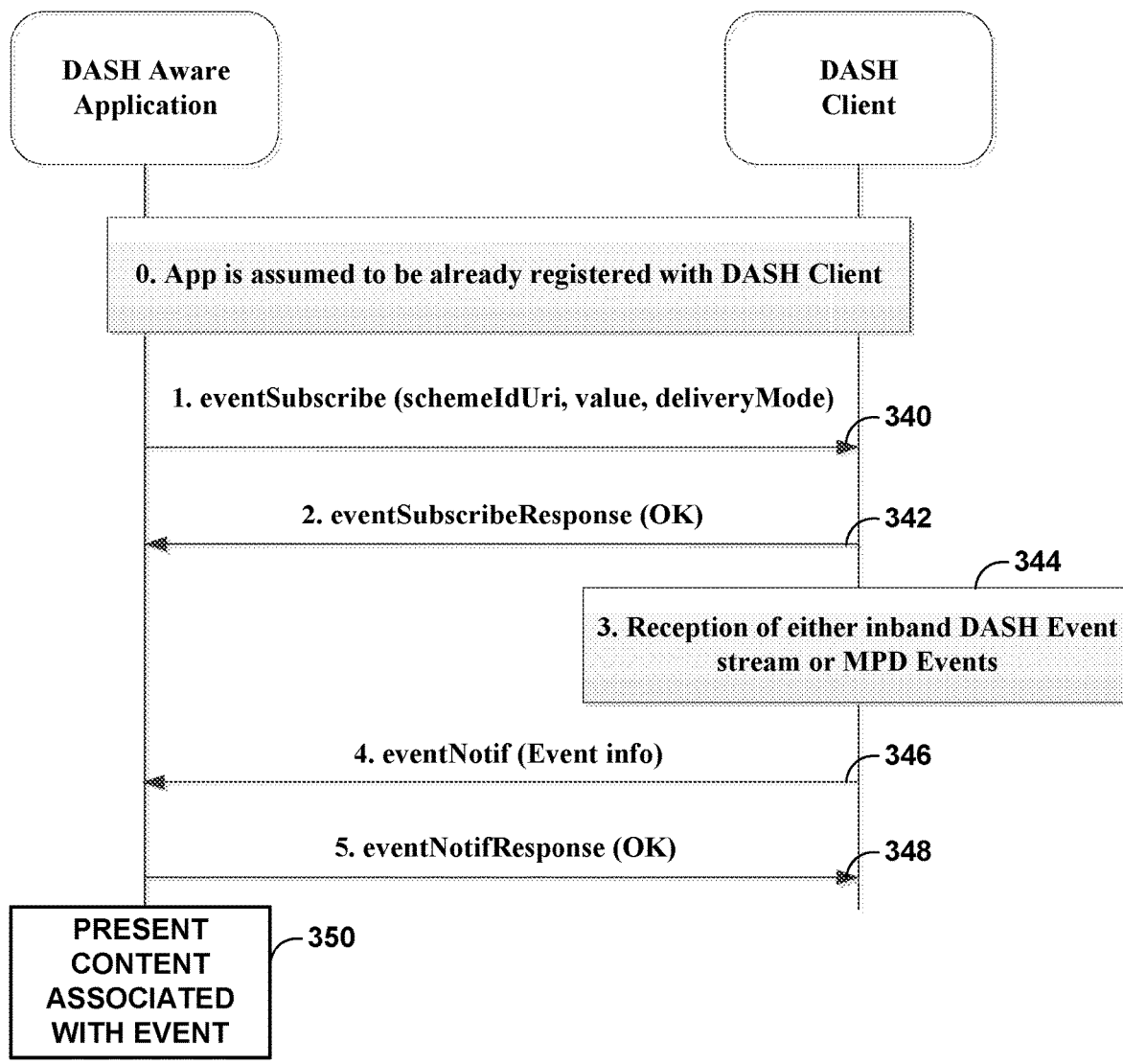
FIG. 8 is a flowchart illustrating an example method of subscription to and notification of two example types of DASH Events messages (carried inband with the media or inside the MPD).

FIG. 8 is a flowchart illustrating an example method of subscription to and notification of two example types of DASH Events messages (carried in-band with the media or inside the MPD). The method of FIG. 8 is performed by a DASH aware application, such as DASH aware application (DAA) 214 of FIG. 2, and a DASH client, such as DASH client 212 of FIG. 2. DAA 214 is assumed to be already registered with DASH Client 212. Initially, DAA 214 sends a subscription to DASH events via a first application programming interface (API), eventSubscribe (schemeidUri, value, deliveryMode) to DASH Client 212 (340). Next, DASH Client 212 sends an eventSubscribeResponse (OK) to DAA 214 (342). Next DASH Client 212 receives data for DASH events, either an in-band DASH Event stream or MPD Events (344). The DASH events may specify interactivity-related content as discussed above. Next, DASH Client 212 sends the data for the one or more DASH events, such as the interactivity-related content, via a second API, eventNotif (Event info), to DAA 214 (346). DAA 214 sends eventNotifResponse (OK) to DASH Client 212 (348). Moreover, DAA 214 may present content associated with the event to the end user (350). For example, DAA 214 may render, to the end-user, contents associated with the interactivity event, such as the interactivity-related content, via a user interface of client device 40, such as video output 184 (FIG. 1).

In this manner, the method of FIG. 8 represents an example of a method including subscribing, by a Dynamic Adaptive Streaming over HTTP (DASH) aware application executed by one or more processors comprising circuitry of a client device, to DASH events of a DASH event stream via a first application programming interface (API) between the DASH aware application and a DASH client executed by the one or more processors; receiving, by the DASH aware application, data for one or more DASH events of the DASH event stream from the DASH client via a second API between the DASH aware application and the DASH client, the data for the one or more DASH events specifying interactivity-related content; and presenting, by the DASH aware application, the interactivity-related content via one or more user interfaces of the client device.

Figure 9:
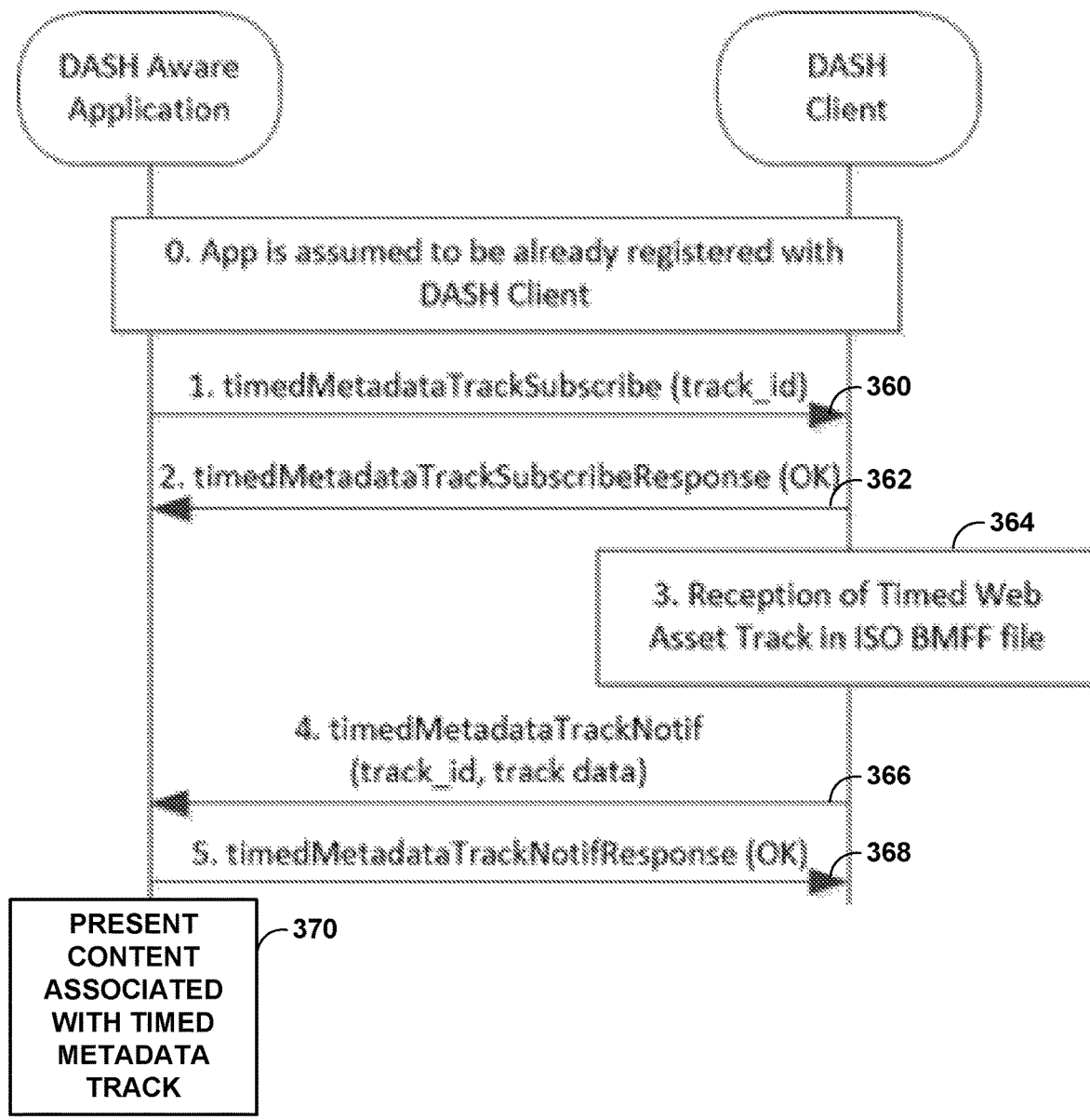
FIG. 9 is a flowchart illustrating an example method of subscription to and notification of Timed Metadata Track messages.

FIG. 9 is a flowchart illustrating an example method of subscription to and notification of Timed Metadata Track messages. The method of FIG. 9 is performed by a DASH aware application, such as DASH aware application 214 of FIG. 2, and a DASH client, such as DASH client 212 of FIG. 2. The timed metadata track messages may contain application-specific metadata or web assets and/or resources for use by DAA 214. When the timed metadata track messages contain web assets and/or resources, the messages may be referred to as timed web asset track messages.

DAA 214 is assumed to be already registered with DASH Client 212. Initially, DAA 214 sends a subscription to DASH events via a first application programming interface (API), timedMetadataTrackSubscribe (track_id), to DASH Client 212 (360). Next, DASH Client 212 sends timedMetadataTrackSubscribeResponse (OK) to DAA 214 (362). Next, DASH Client 212 receives Timed Metadata Track data in an ISO BMFF file (364), containing metadata to be used by DAA 214 to perform interactivity-related tasks. Additionally or alternatively, the Timed Metadata Track may contain timed web resources, such as an HTML5 video track. Next, DASH Client 212 sends timed metadata track data via a second API, timedMetadataTrackNotif (track_id, track data), to DAA 214 (366). DAA 214 then sends the timedMetadataTrackNotifResponse (OK) to DASH Client 212 (368). Moreover, DAA 214 may present content associated with the timed metadata track (370) to a user via a user interface of client device 40, such as video output 184 (FIG. 1). The method of FIG. 9 may be performed in conjunction with the method of any of FIGS. 5-7.

Figure 10:
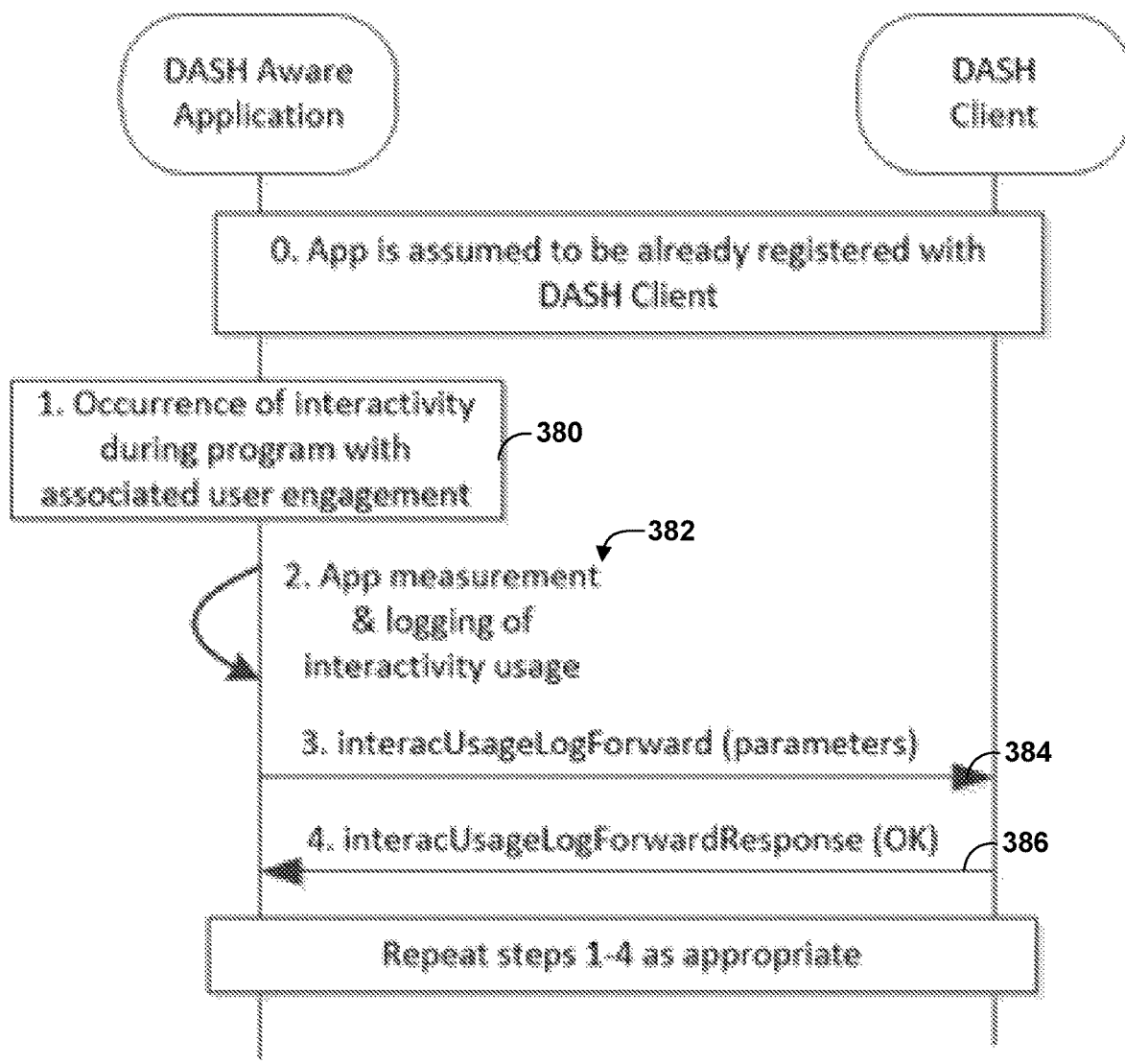
FIG. 10 is a flowchart illustrating an example method of forwarding an interactivity usage log message.

FIG. 10 is a flowchart illustrating an example method of forwarding an interactivity usage log message. The method of FIG. 10 is performed by a DASH aware application, such as DASH aware application 214 of FIG. 2, and a DASH client, such as DASH client 212 of FIG. 2. The method of FIG. 10 may follow presentation of interactivity-related content, e.g., according to any of FIGS. 5-7. DAA 214 initially detects the occurrence of interactivity-related content being presented during a program with associated user engagement (380). Next, DAA 214 measures and logs interactivity occurrences (382). Next, DAA 214 sends data representing the interactivity information via an API, interactUsageLogForward (parameters), to DASH Client 212 (384). Next, DASH Client 212 sends an interactUsageLogForardResponse (OK) (386) to DAA 214. The four steps of FIG. 10 may be repeated as appropriate.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving media data, the method comprising:
subscribing, by a Dynamic Adaptive Streaming over HTTP (DASH) aware application executed by one or more processors comprising circuitry of a client device, to DASH events of a DASH event stream via a first application programming interface (API) between the DASH aware application and a DASH client executed by the one or more processors, the DASH events being carried in-band with and separate from video data of a DASH media stream, the DASH events including data for interactivity-related content to be visually presented to a user of the client device and to allow the user to interact with the interactivity-related content, and wherein subscribing comprises sending data, by the DASH aware application, to the DASH client via the first API, the DASH aware application being configured to process data for the DASH events;
receiving, by the DASH aware application, data for one or more of the DASH events of the DASH event stream from the DASH client via a second API between the DASH aware application and the DASH client, the data for the one or more of the DASH events specifying the interactivity-related content, the interactivity-related content comprising content that is unrelated to media content selection; and
presenting, by the DASH aware application, the interactivity-related content via one or more user interfaces of the client device.

2. The method of claim 1, wherein presenting the interactivity-related content comprises synchronizing presentation of the interactivity-related content with presentation of corresponding media data.

3. The method of claim 1, wherein the interactivity-related content comprises at least one of voting, rating, purchasing, chatting, or targeted advertisements with which a user can interact via a user interface, the user interface comprising at least one of a hyperlink, a radio button, or a displayed form.

4. The method of claim 1, further comprising:
receiving, by the DASH aware application and from the DASH client, instructions representing interactivity-related content usage metrics to be measured and how corresponding measurements should be returned to the DASH client;
measuring, by the DASH aware application, usage of the interactivity-related content by a user according to the instructions; and
forwarding, by the DASH aware application, data representing the usage of the interactivity-related content to the DASH client according to the instructions.

5. The method of claim 4,
wherein receiving the instructions comprises receiving data defining a format for how the corresponding measurements should be returned to the DASH client, and
wherein forwarding the data representing the usage of the interactivity-related content comprises forwarding the data representing the usage of the interactivity-related content via a third API to the DASH client and formatted according to the instructions.

6. The method of claim 5, wherein the third API comprises at least one of interacUsageMeasurementNotify( ) or interacUsageLogForward( ).

7. The method of claim 1, wherein the first API comprises eventSubscribe( ), and wherein the second API comprises eventResponse( ).

8. The method of claim 1, wherein the first API comprises inbandEventSubscribe( ), and wherein the second API comprises inbandEventSubscribeResponse( ).

9. The method of claim 1, wherein the first API comprises eventNotif( ), and wherein the second API comprises eventNotifResponse( ).

10. The method of claim 1, wherein the first API comprises inbandEventNotif( ), and wherein the second API comprises inbandEventNotifResponse( ).

11. The method of claim 1, wherein the first API comprises mpdEventNotif( ), and wherein the second API comprises mpdEventNotifResponse( ).

12. The method of claim 1, further comprising:
subscribing, by the DASH aware application, to timed metadata track data via a third API to the DASH client;
receiving, by the DASH aware application, data of one or more timed metadata tracks via a fourth API from the DASH client; and
presenting, by the DASH aware application, the data of the one or more timed metadata tracks via the one or more user interfaces of the client device.

13. The method of claim 12, wherein the third API comprises timedMetadataTrackSubscribe( ), and wherein the fourth API comprises timedMetadataTrackResponse( ).

14. The method of claim 12, wherein the third API comprises timedMetadataTrackNotif( ), and wherein the fourth API comprises timedMetadataTrackNotifResponse( ).

15. A device for receiving media data, the device comprising:
one or more user interfaces for presenting media data; and
one or more processors implemented in circuitry and configured to execute a Dynamic Adaptive Streaming over HTTP (DASH) aware application and a DASH client, wherein the DASH aware application is configured to:
subscribe to DASH events of a DASH event stream via a first application programming interface (API) between the DASH aware application and the DASH client, the DASH events being carried in-band with and separate from video data of a DASH media stream, the DASH events including data for interactivity-related content to be visually presented to a user of the device and to allow the user to interact with the interactivity-related content, and wherein to subscribe, the DASH aware application is configured to send data to the DASH client via the first API, the DASH aware application being configured to process data for the DASH events;
receive data for one or more of the DASH events of the DASH event stream from the DASH client via a second API between the DASH aware application and the DASH client, the data for the one or more of the DASH events specifying the interactivity-related content, the interactivity-related content comprising content that is unrelated to media content selection; and present the interactivity-related content via the one or more user interfaces of the client device.

16. The device of claim 15, wherein the DASH aware application is configured to synchronize presentation of the interactivity-related content with presentation of corresponding media data.

17. The device of claim 15, wherein the interactivity-related content comprises at least one of voting, rating, purchasing, chatting, or targeted advertisements with which a user can interact via a user interface, the user interface comprising at least one of a hyperlink, a radio button, or a displayed form.

18. The device of claim 15, wherein the DASH aware application is further configured to:
receive, from the DASH client, instructions representing interactivity-related content usage metrics to be measured and how corresponding measurements should be returned to the DASH client;
measure usage of the interactivity-related content by a user according to the instructions; and
forward data representing the usage of the interactivity-related content to the DASH client according to the instructions.

19. The device of claim 18,
wherein the instructions include data defining a format for how the corresponding measurements should be returned to the DASH client, and
wherein the DASH aware application is configured to send the data representing the usage of the interactivity-related content via a third API to the DASH client and formatted according to the instructions.

20. The device of claim 15, wherein the DASH aware application is further configured to:
subscribe to timed metadata track data via a third API to the DASH client;
receive data of one or more timed metadata tracks via a fourth API from the DASH client; and
present content associated with the one or more timed metadata tracks via the one or more user interfaces of the client device.

21. A device for receiving media data, the device comprising:
means for executing a Dynamic Adaptive Streaming over HTTP (DASH) aware application to subscribe to DASH events of a DASH event stream via a first application programming interface (API) between the DASH aware application and a DASH client, the DASH events being carried in-band with and separate from video data of a DASH media stream, the DASH events including data for interactivity-related content to be visually presented to a user of the device and to allow the user to interact with the interactivity-related content, and wherein the means for executing the DASH aware application to subscribe comprises means for sending data to the DASH client via the first API, the DASH aware application being configured to process data for the DASH events;
means for executing the DASH aware application to receive data for one or more of the DASH events of the DASH event stream from the DASH client via a second API between the DASH aware application and the DASH client, the data for the one or more of the DASH events specifying the interactivity-related content, the interactivity-related content comprising content that is unrelated to media content selection; and
means for presenting the interactivity-related content.

22. A non-transitory computer-readable storage medium having stored thereon instructions that, when executed, cause one or more processors that execute a Dynamic Adaptive Streaming over HTTP (DASH) aware application and a DASH client to:
subscribe, by the DASH aware application, to DASH events of a DASH event stream via a first application programming interface (API) between the DASH aware application and the DASH client, the DASH events being carried in-band with and separate from video data of a DASH media stream, the DASH events including data for interactivity-related content to be visually presented to a user of a device including the DASH client and the DASH aware application and to allow the user to interact with the interactivity-related content, and wherein subscribing comprises sending data, by the DASH aware application, to the DASH client via the first API, the DASH aware application being configured to process data for the DASH events;
receive, by the DASH aware application, data for one or more of the DASH events of the DASH event stream from the DASH client via a second API between the DASH aware application and the DASH client, the data for the one or more of the DASH events specifying the interactivity-related content, the interactivity-related content comprising content that is unrelated to media content selection; and
present, by the DASH aware application, the interactivity-related content via one or more user interfaces of the client device.

23. The non-transitory computer-readable storage medium of claim 22, wherein the instructions that cause the processor to present the interactivity-related content comprise instructions that cause the processor to synchronize presentation of the interactivity-related content with presentation of corresponding media data.

24. The non-transitory computer-readable storage medium of claim 22, wherein the interactivity-related content comprises at least one of voting, rating, purchasing, chatting, or targeted advertisements with which a user can interact via a user interface, the user interface comprising at least one of a hyperlink, a radio button, or a displayed form.

25. The non-transitory computer-readable storage medium of claim 22, further comprising instructions that cause the processor to:
receive, by the DASH aware application and from the DASH client, instructions representing interactivity-related content usage metrics to be measured and how corresponding measurements should be returned to the DASH client;
measure, by the DASH aware application, usage of the interactivity-related content by a user according to the instructions; and
forward, by the DASH aware application, data representing the usage of the interactivity-related content to the DASH client according to the instructions.

26. The non-transitory computer-readable storage medium of claim 25,
wherein the instructions that cause the processor to receive the instructions comprise instructions that cause the processor to receive data defining a format for how the corresponding measurements should be returned to the DASH client, and wherein the instructions that cause the processor to forward the data representing the usage of the interactivity-related content comprise instructions that cause the processor to forward the data representing the usage of the interactivity-related content via a third API to the DASH client and formatted according to the instructions.

27. The non-transitory computer-readable storage medium of claim 25, further comprising instructions that cause the processor to:
subscribe, by the DASH aware application, to timed metadata track data via a third API to the DASH client;
receive, by the DASH aware application, data of one or more timed metadata tracks via a fourth API from the DASH client; and
present, by the DASH aware application, the data of the one or more timed metadata tracks via the one or more user interfaces of the client device.

\* \* \* \* \*